US012637045B2

(12) United States Patent
Yoshida et al.

(10) Patent No.: US 12,637,045 B2
(45) Date of Patent: May 26, 2026

(54) BRAKE SYSTEM

(71) Applicants: DENSO CORPORATION, Kariya-city (JP); ADVICS CO., LTD., Kariya-city (JP)

(72) Inventors: Kazuhiro Yoshida, Kariya-city (JP); Hiroto Yoshida, Toyota (JP); Sho Fukami, Kariya-city (JP)

(73) Assignees: DENSO CORPORATION, Kariya-city (JP); ADVICS CO., LTD., Kariya-city (JP)

( * ) Notice: Subject to any disclaimer, the term of this patent is extended or adjusted under 35 U.S.C. 154(b) by 63 days.

(21) Appl. No.: 18/917,281

(22) Filed: Oct. 16, 2024

(65) Prior Publication Data

US 2025/0033613 A1 Jan. 30, 2025

Related U.S. Application Data

(63) Continuation of application No. PCT/JP2023/016714, filed on Apr. 27, 2023.

(30) Foreign Application Priority Data

Apr. 29, 2022 (JP) ................................. 2022-075562

(51) Int. Cl.
*B60T 8/171* (2006.01)
*B60T 8/172* (2006.01)
(52) U.S. Cl.
CPC .............. *B60T 8/171* (2013.01); *B60T 8/172* (2013.01); *B60T 2220/04* (2013.01); *B60T 2270/402* (2013.01); *B60T 2270/404*

(2013.01); *B60T 2270/406* (2013.01); *B60T 2270/413* (2013.01); *B60T 2270/82* (2013.01)

(58) Field of Classification Search
CPC ...... B60T 8/171; B60T 8/172; B60T 2220/04; B60T 2270/402; B60T 2270/403; B60T 2270/404; B60T 2270/406; B60T 2270/413; B60T 2270/82
See application file for complete search history.

(56) References Cited

U.S. PATENT DOCUMENTS

| | | | |
|---|---|---|---|
| 5,954,407 A * | 9/1999 | Schramm .............. | B60T 8/3255 303/155 |
| 2022/0266805 A1* | 8/2022 | Park ........................ | B60T 8/885 |
| 2023/0018082 A1* | 1/2023 | Huge ........................ | B60T 8/92 |
| 2025/0065855 A1* | 2/2025 | Yoo ........................... | B60T 8/96 |

* cited by examiner

*Primary Examiner* — Jacob M Amick
(74) *Attorney, Agent, or Firm* — Nixon & Vanderhve P.C.

(57) ABSTRACT

To a first electronic control unit, three or more sensors excluding one predetermined sensor are connected. To a second electronic control unit, two sensors, which include one common sensor, of the three or more sensors, are connected. When the first electronic control unit does not determine that a sensor in a normal state is present among the three or more sensors, and the second electronic control unit determines that both of the two sensors are in the normal state, the electronic control unit controls the brake circuit based on the operation amount detected by at least one of the predetermined sensor or the common sensor.

7 Claims, 10 Drawing Sheets

| ECU MUTUAL MONITORING | DETERMINATION CONDITION | | | FIRST ECU PROCESS | | FINAL PEDAL OPERATION AMOUNT |
|---|---|---|---|---|---|---|
| | Fs1 ≠ ABNORMAL, Fs2 ≠ ABNORMAL, AND Δs1 < ALLOWABLE ERROR ? | Fs1 ≠ ABNORMAL, Fs3 ≠ ABNORMAL, AND Δs2 < ALLOWABLE ERROR ? | Fs2 ≠ ABNORMAL, Fs3 ≠ ABNORMAL, AND Δs3 < ALLOWABLE ERROR ? | MAJORITY DETERMINATION RESULT | DETERMINED PEDAL OPERATION AMOUNT | |
| SECOND ECU = NORMAL | YES | YES | YES | NORMAL | Fs1 | Fs1 OR Fs2 CALCULATED BY FIRST ECU |
| | NO | NO | YES | ONE FAILURE (FIRST SENSOR FAILS) | Fs2 | |
| | NO | YES | NO | ONE FAILURE (SECOND SENSOR FAILS) | Fs1 | |
| | YES | NO | NO | ONE FAILURE (FOURTH SENSOR FAILS) | Fs1 | |
| | OTHER THAN THOSE ABOVE | | | MAJORITY FAILURE (TWO OR MORE ABNORMALITIES) | INDEFINITE | CALCULATED BY SECOND ECU |
| SECOND ECU = ABNORMAL | YES | YES | YES | NORMAL | Fs1 | Fs1 OR Fs2 CALCULATED BY FIRST ECU |
| | NO | NO | YES | ONE FAILURE (FIRST SENSOR FAILS) | Fs2 | |
| | NO | YES | NO | ONE FAILURE (SECOND SENSOR FAILS) | Fs1 | |
| | YES | NO | NO | ONE FAILURE (FOURTH SENSOR FAILS) | Fs1 | |
| | OTHER THAN THOSE ABOVE | | | MAJORITY FAILURE (TWO OR MORE ABNORMALITIES) | INDEFINITE | NOT CALCULABLE (THREE OR MORE FAILURES) |

FIG. 3

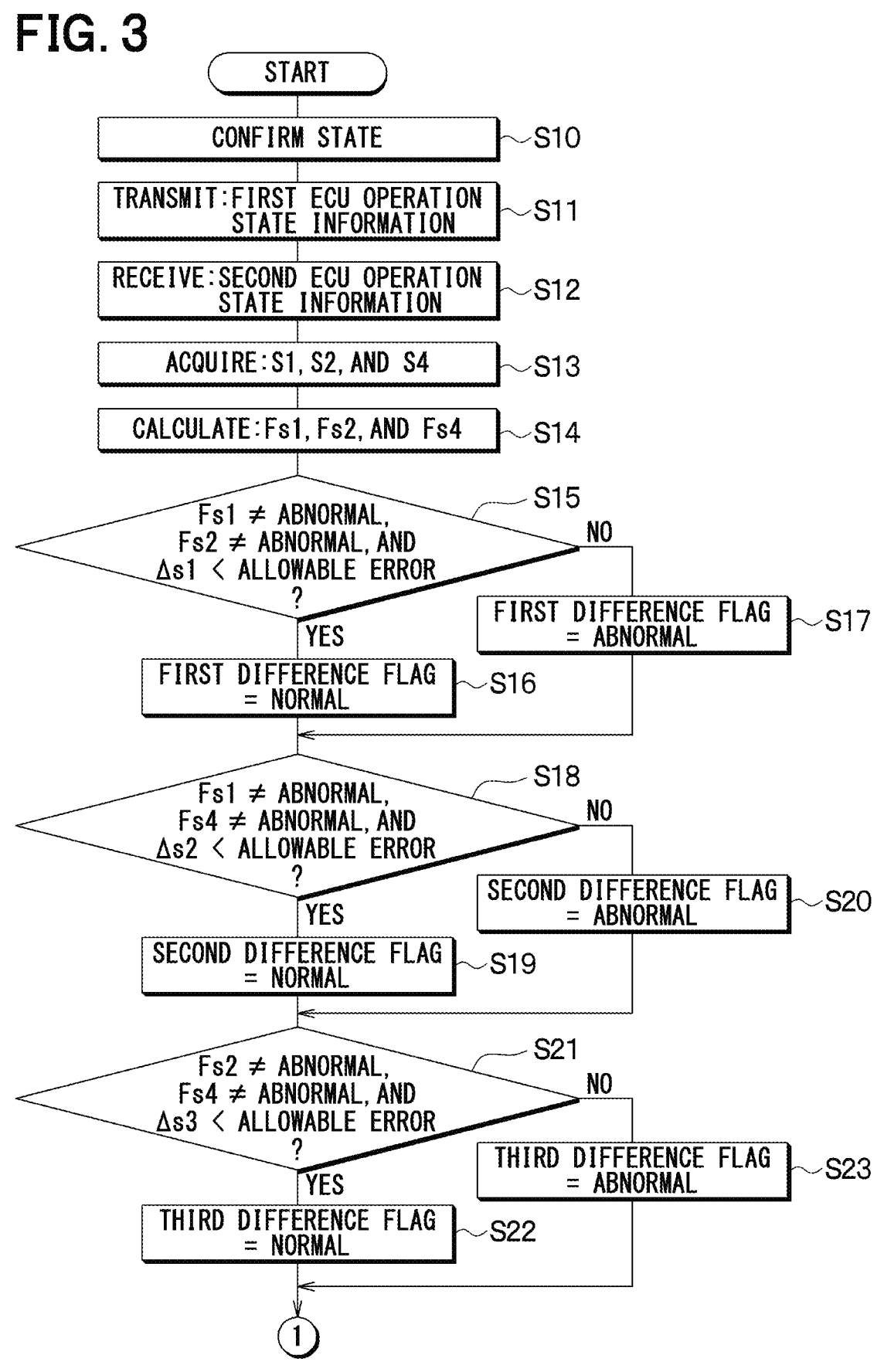

START

CONFIRM STATE — S10

TRANSMIT:FIRST ECU OPERATION STATE INFORMATION — S11

RECEIVE:SECOND ECU OPERATION STATE INFORMATION — S12

ACQUIRE:S1, S2, AND S4 — S13

CALCULATE:Fs1,Fs2, AND Fs4 — S14

$Fs1 \neq$ ABNORMAL, $Fs2 \neq$ ABNORMAL, AND $\Delta s1 <$ ALLOWABLE ERROR ? — S15

NO → FIRST DIFFERENCE FLAG = ABNORMAL — S17

YES → FIRST DIFFERENCE FLAG = NORMAL — S16

$Fs1 \neq$ ABNORMAL, $Fs4 \neq$ ABNORMAL, AND $\Delta s2 <$ ALLOWABLE ERROR ? — S18

NO → SECOND DIFFERENCE FLAG = ABNORMAL — S20

YES → SECOND DIFFERENCE FLAG = NORMAL — S19

$Fs2 \neq$ ABNORMAL, $Fs4 \neq$ ABNORMAL, AND $\Delta s3 <$ ALLOWABLE ERROR ? — S21

NO → THIRD DIFFERENCE FLAG = ABNORMAL — S23

YES → THIRD DIFFERENCE FLAG = NORMAL — S22

| ECU MUTUAL MONITORING | DETERMINATION CONDITION | | | FIRST ECU PROCESS | | FINAL PEDAL OPERATION AMOUNT |
|---|---|---|---|---|---|---|
| | Fs1 ≠ ABNORMAL, Fs2 ≠ ABNORMAL, AND Δs1 < ALLOWABLE ERROR ? | Fs1 ≠ ABNORMAL, Fs3 ≠ ABNORMAL, AND Δs2 < ALLOWABLE ERROR ? | Fs2 ≠ ABNORMAL, Fs3 ≠ ABNORMAL, AND Δs3 < ALLOWABLE ERROR ? | MAJORITY DETERMINATION RESULT | DETERMINED PEDAL OPERATION AMOUNT | |
| SECOND ECU = NORMAL | YES | YES | YES | NORMAL | Fs1 | |
| | NO | NO | YES | ONE FAILURE (FIRST SENSOR FAILS) | Fs2 | Fs1 OR Fs2 CALCULATED BY FIRST ECU |
| | NO | YES | NO | ONE FAILURE (SECOND SENSOR FAILS) | Fs1 | |
| | YES | NO | NO | ONE FAILURE (FOURTH SENSOR FAILS) | Fs1 | |
| | OTHER THAN THOSE ABOVE | | | MAJORITY FAILURE (TWO OR MORE ABNORMALITIES) | INDEFINITE | CALCULATED BY SECOND ECU |
| SECOND ECU = ABNORMAL | YES | YES | YES | NORMAL | Fs1 | |
| | NO | NO | YES | ONE FAILURE (FIRST SENSOR FAILS) | Fs2 | Fs1 OR Fs2 CALCULATED BY FIRST ECU |
| | NO | YES | NO | ONE FAILURE (SECOND SENSOR FAILS) | Fs1 | |
| | YES | NO | NO | ONE FAILURE (FOURTH SENSOR FAILS) | Fs1 | |
| | OTHER THAN THOSE ABOVE | | | MAJORITY FAILURE (TWO OR MORE ABNORMALITIES) | INDEFINITE | NOT CALCULABLE (THREE OR MORE FAILURES) |

FIG. 10

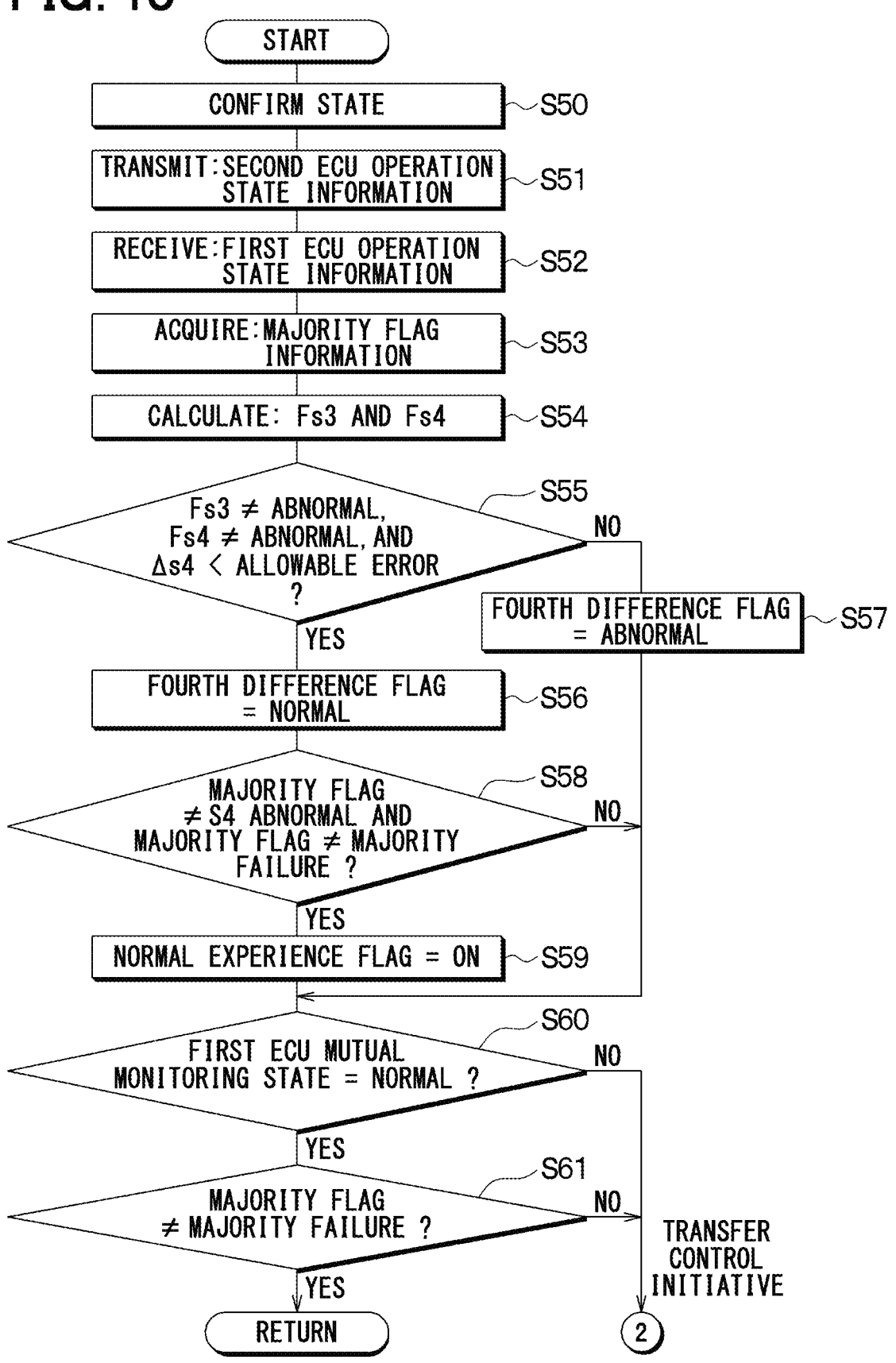

START

CONFIRM STATE ～S50

TRANSMIT:SECOND ECU OPERATION STATE INFORMATION ～S51

RECEIVE:FIRST ECU OPERATION STATE INFORMATION ～S52

ACQUIRE:MAJORITY FLAG INFORMATION ～S53

CALCULATE: Fs3 AND Fs4 ～S54

Fs3 ≠ ABNORMAL, Fs4 ≠ ABNORMAL, AND Δs4 < ALLOWABLE ERROR ? ～S55

NO

FOURTH DIFFERENCE FLAG = ABNORMAL ～S57

YES

FOURTH DIFFERENCE FLAG = NORMAL ～S56

MAJORITY FLAG ≠ S4 ABNORMAL AND MAJORITY FLAG ≠ MAJORITY FAILURE ? ～S58

NO

YES

NORMAL EXPERIENCE FLAG = ON ～S59

FIRST ECU MUTUAL MONITORING STATE = NORMAL ? ～S60

NO

YES

MAJORITY FLAG ≠ MAJORITY FAILURE ? ～S61

NO

TRANSFER CONTROL INITIATIVE

YES

RETURN

| ECU MUTUAL MONITORING | MAJORITY DETERMINATION RESULT (RECEIVED FROM FIRST ECU) | DETERMINATION CONDITION Fs3 ≠ ABNORMAL, Fs4 ≠ ABNORMAL, AND $\Delta$s4 < ALLOWABLE ERROR ? | SECOND ECU PROCESS DETERMINED PEDAL OPERATION AMOUNT | FINAL PEDAL OPERATION AMOUNT |
|---|---|---|---|---|
| FIRST ECU = NORMAL | NORMAL | YES | Fs3 | CALCULATED BY FIRST ECU |
| | | NO | INDEFINITE | |
| | ONE FAILURE (FIRST SENSOR FAILS) | YES | Fs3 | |
| | | NO | INDEFINITE | |
| | MAJORITY FAILURE (TWO OR MORE ABNORMALITIES) | YES | Fs3 | Fs3 CALCULATED BY SECOND ECU |
| | | NO | Fs3 | Fs3 CALCULATED BY SECOND ECU |
| FIRST ECU = ABNORMAL | FAILURE DUE TO ABNORMAL | YES | Fs3 | Fs3 CALCULATED BY SECOND ECU |
| | | NO | INDEFINITE | NOT CALCULABLE (THREE OR MORE FAILURES) |

BRAKE SYSTEM

CROSS REFERENCE TO RELATED APPLICATION

The present application is a continuation application of International Patent Application No. PCT/JP2023/016714 filed on Apr. 27, 2023, which designated the U.S. and claims the benefit of priority from Japanese Patent Application No. 2022-075562 filed on Apr. 29, 2022. The entire disclosures of all of the above applications are incorporated herein by reference.

TECHNICAL FIELD

The present disclosure relates to a brake system.

BACKGROUND

Conventionally, a known vehicle brake apparatus includes a pedal measurement unit that measures a brake pedal.

SUMMARY

An aspect of the present disclosure relates to a brake system configured to control a brake circuit that is configured to brake a vehicle. The brake system comprises: four or more sensors configured to detect an operation amount of a brake pedal operated by a driver and generate a detection signal corresponding to the detected operation amount to output the generated detection signal; and an electronic control unit configured to control the brake circuit based on the operation amounts detected by the four or more sensors.

BRIEF DESCRIPTION OF THE DRAWINGS

The above and other objects, features and advantages of the present disclosure will become more apparent from the following detailed description made with reference to the accompanying drawings. In the drawings:

FIG. 3 is a flowchart showing a control process for updating a first difference flag, a second difference flag, and a third difference flag, which is executed by a first ECU in the present embodiment;

FIG. 9 is a table showing an operation amount of a brake pedal determined by the first ECU;

FIG. 10 is a flowchart showing a control process for updating a fourth difference flag, which is executed by a second ECU in the present embodiment;

FIG. 12 is a table showing an operation amount of a brake pedal determined by the second ECU.

DETAILED DESCRIPTION

Figure 1:
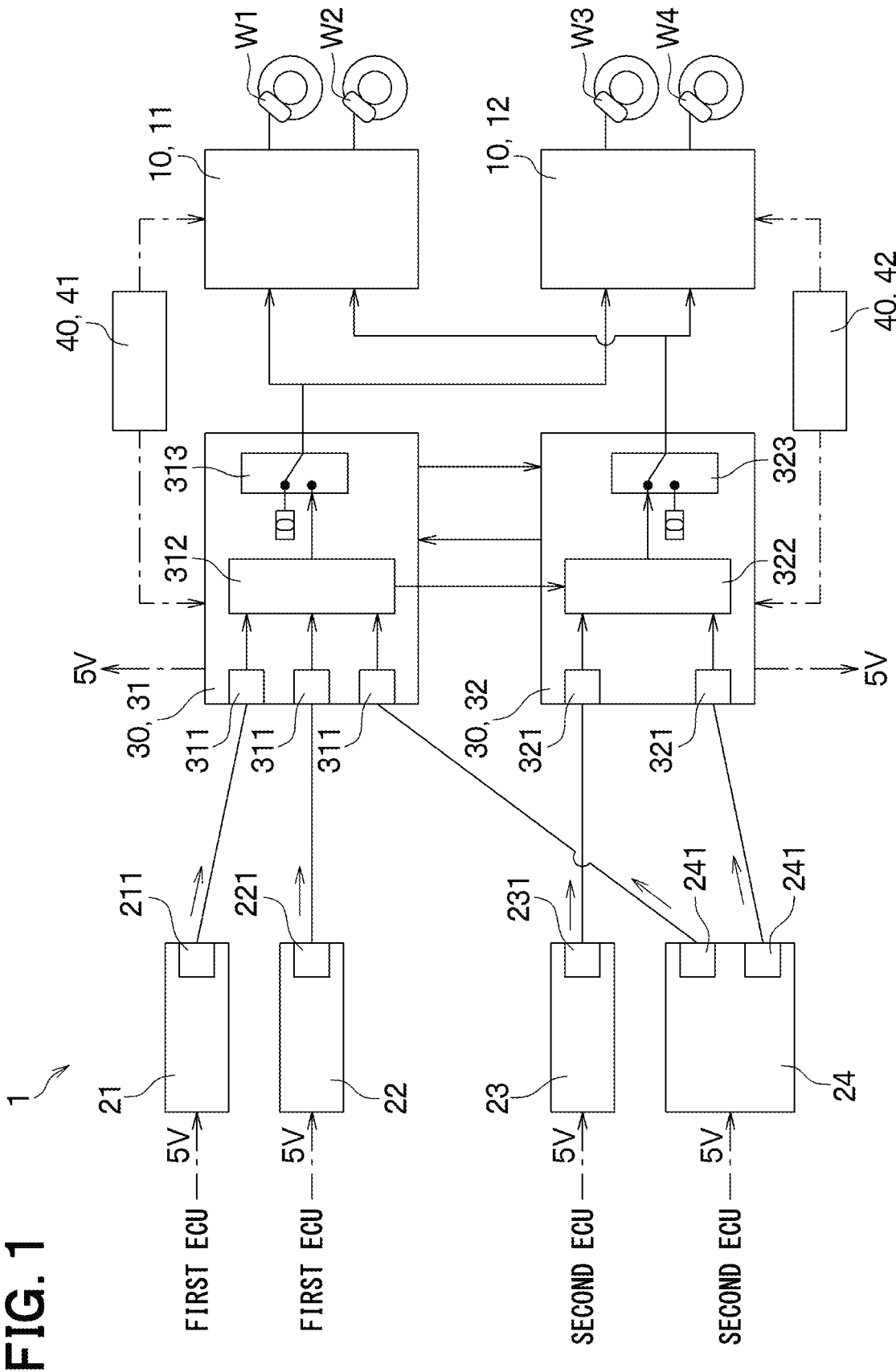
FIG. 1 is a schematic configuration diagram of a brake system according to the present embodiment.

Hereinafter, examples of the present disclosure will be described.

According to an example of the present disclosure, a vehicle brake apparatus includes a pedal measurement unit that measures a brake pedal and a computer device that obtain a brake target value based on a measurement result measured by the pedal measurement unit. The pedal measurement unit of the vehicle brake apparatus includes a first measurement device and a second measurement device that are provided independently of each other and that supply a signal corresponding to a pedal operation, and a monitor element that checks the measurement values measured by the first measurement device and the second measurement device. The monitor element compares a measurement result of the brake pedal measured by the monitor element with a measurement result of the brake pedal measured by each of the first measurement device and the second measurement device, to determine whether the measurement result of each of the first measurement device and the second measurement device is normal or abnormal. The computer device obtains the brake target value based on the measurement result of the measurement device that is determined as being functioning normally by the monitor element, out of the measurement result of the first measurement device and the measurement result of the second measurement device. This configuration ensures redundancy in the brake system that controls a brake circuit that brakes a vehicle. Hereinafter, the measurement device that measures the brake pedal will also be referred to as a sensor.

However, when the brake system includes three sensors and two of the three sensors fail and are in an abnormal state, it is not possible to specify a normal detection signal by simply comparing respective detection signals of the three sensors without specifying the sensor in an abnormal state. In this case, the redundancy in the brake system cannot be ensured. This fact has been discovered by the inventors as a result of detailed investigations.

An aspect of the present disclosure relates to a brake system configured to control a brake circuit that is configured to brake a vehicle. The brake system comprises: four or more sensors configured to detect an operation amount of a brake pedal operated by a driver and generate a detection signal corresponding to the detected operation amount to output the generated detection signal; and an electronic control unit configured to control the brake circuit based on the operation amounts detected by the four or more sensors. The electronic control unit includes a first electronic control unit to which three or more sensors of the four or more sensors, excluding one predetermined sensor of the four or more sensors, are connected, and a second electronic control unit to which two sensors, which include the predetermined sensor and one common sensor, of the three or more sensors are connected. The first electronic control unit is capable of determining whether a sensor in a normal state is present among the three or more sensors based on the respective operation amounts detected by the three or more sensors.

The second electronic control unit is capable of determining whether both of the two sensors are in a normal state based on the respective operation amounts detected by the two sensors. When the first electronic control unit does not determine that the sensor in a normal state is present among the three or more sensors, and the second electronic control unit determines that both of the two sensors are in the normal state, the electronic control unit is configured to control the brake circuit based on the operation amount detected by at least one of the predetermined sensor or the common sensor.

Accordingly, even when the two sensors of the three or more sensors connected to the first electronic control unit are in an abnormal state, the brake circuit can be controlled based on the operation amount detected by the predetermined sensor and the common sensor that are connected to the second electronic control unit. Therefore, the redundancy in the brake system can be ensured.

Figure 2:
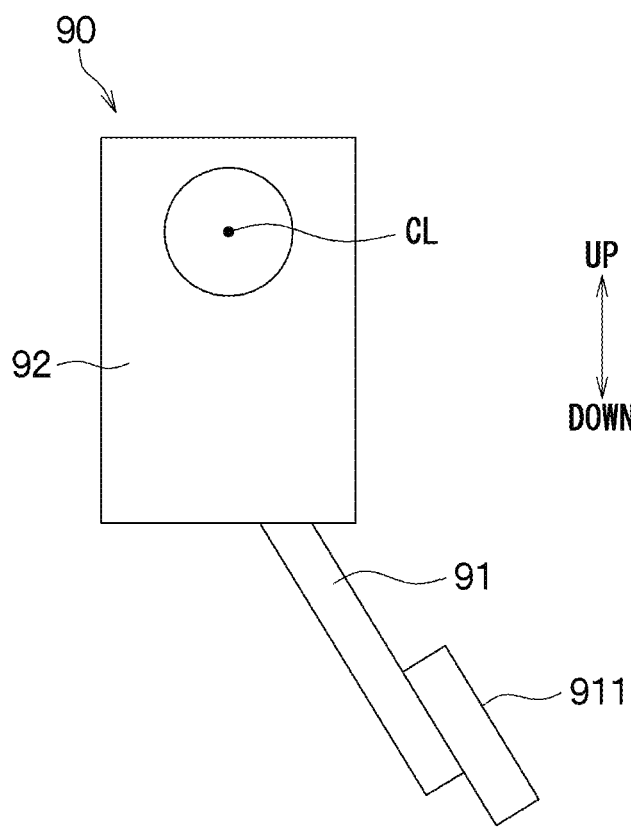
FIG. 2 is an external view of a brake pedal device according to the present embodiment.
Figure 4:
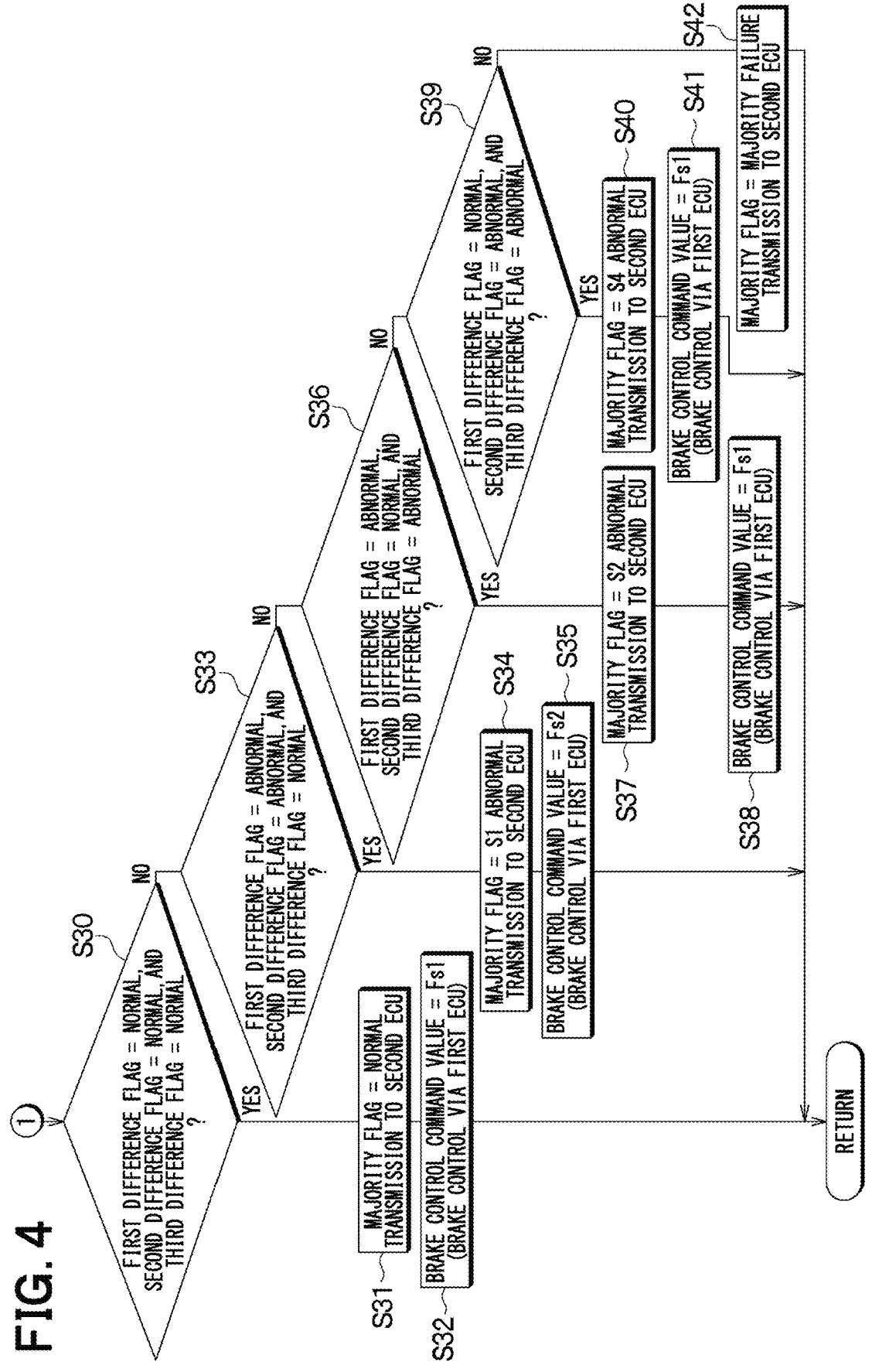
FIG. 4 is a flowchart showing a majority determination process executed by the first ECU in the present embodiment.

An embodiment of the present disclosure will be described with reference to FIGS. 1 to 12. A brake system 1 of the present disclosure is a brake-by-wire system that controls the brakes of a vehicle based on an operation amount of a brake pedal 91 shown in FIG. 2. As shown in FIG. 1, the brake system 1 includes a brake circuit 10 that brakes a vehicle, and wheel cylinders W1 to W4 of which an operation is controlled by the brake circuit 10. As shown in FIGS. 1 and 2, the brake system 1 also includes a brake pedal device 90 including the brake pedal 91, a first sensor 21 to a fourth sensor 24 that detect an operation amount of the brake pedal 91, and an electronic control unit 30 that controls driving of the brake circuit 10. The brake system 1 includes a power supply unit 40 that supplies electric power to the brake circuit 10 and the electronic control unit 30. The first sensor 21 to the fourth sensor 24 are provided in the brake pedal device 90. Hereinafter, the electronic control unit 30 will also be referred to as an ECU 30. ECU is an abbreviation for electronic control unit. The ECU may be referred to as a brake control unit (BCU).

The wheel cylinders W1 to W4 are disposed in the respective wheels of the vehicle. Brake pads (not shown) is attached to each of the wheel cylinders W1 to W4.

The brake circuit 10 may adopt various mechanisms. For example, the brake circuit 10 of the present embodiment generates a brake fluid pressure in the wheel cylinders W1 to W4, thereby generating a braking force that decelerates the vehicle. The brake circuit 10 may adopt an electric brake that brakes each wheel by driving an electric motor to press the brake pads against disc brake rotors. The brake circuit 10 also can execute normal control, ABS control, VSC control, and the like in response to a control signal from the ECU 30. ABS is an abbreviation for anti-lock braking system. VSC is an abbreviation for vehicle stability control.

The brake circuit 10 includes a first brake circuit 11 and a second brake circuit 12 that are provided independently of each other. The first brake circuit 11 generates the brake fluid pressure in a left front wheel cylinder W1 disposed on a left front wheel and a right front wheel cylinder W2 disposed on a right front wheel. The second brake circuit 12 generates the brake fluid pressure in a left rear wheel cylinder W3 disposed on a left rear wheel and a right rear wheel cylinder W4 disposed on a right rear wheel.

The first brake circuit 11 and the second brake circuit 12 are supplied with driving electric power from a power supply unit 40. Each of the first brake circuit 11 and the second brake circuit 12 is connected to the ECU 30 and is controlled by the control signal transmitted from the ECU 30.

The power supply unit 40 includes a first power supply unit 41 and a second power supply unit 42 that are provided independently of each other. The first power supply unit 41 is connected to the first brake circuit 11 and supplies the electric power to the first brake circuit 11. The second power supply unit 42 is connected to the second brake circuit 12 and supplies the electric power to the second brake circuit 12. As described above, in the brake system 1 of the present embodiment, a source for supplying the electric power to the brake circuit 10 is made redundant by providing a source for supplying the electric power to the first brake circuit 11 and a source for supplying the electric power to the second brake circuit 12 with different configurations.

The ECU 30 includes a microcomputer including a processor that executes a control process or an arithmetic process, storage units such as a ROM and a RAM that store programs, data, and the like, and peripheral circuits thereof. The storage unit is formed of a non-transitory tangible storage medium. The ECU 30 includes a first ECU 31 and a second ECU 32. The first ECU 31 and the second ECU 32 execute various control processes and arithmetic processes based on the programs stored in the storage units, and control the operation of the brake circuit 10.

The first ECU 31 includes three first ECU reception units 311 that receive respective detection signals transmitted from the first sensor 21, the second sensor 22, and the fourth sensor 24, and a first ECU processing unit 312 that processes the respective detection signal received by the three first ECU reception units 311. The first ECU 31 also includes a first ECU switch 313 that turns on and off the connection between the first ECU 31 and the brake circuit 10. In the first ECU 31, the three first ECU reception units 311 are provided independently of each other, and the first sensor 21, the second sensor 22, and the fourth sensor 24 are directly connected to the three first ECU reception units 311. The first ECU 31 is connected to the first brake circuit 11 and the second brake circuit 12 via the first ECU switch 313. The first ECU 31 is connected to the first power supply unit 41 and receives the driving electric power supplied from the first power supply unit 41. In the present embodiment, the first ECU 31 functions as a first electronic control unit.

The second ECU 32 includes two second ECU reception units 321 that receive detection signals transmitted from the third sensor 23 and the fourth sensor 24, and a second ECU processing unit 322 that processes the detection signals received by the two second ECU reception units 321. The second ECU 32 also includes a second ECU switch 323 that turns on and off the connection between the second ECU 32 and the brake circuit 10. In the second ECU 32, the two second ECU reception units 321 are provided independently of each other, and the third sensor 23 and the fourth sensor 24 are directly connected to the two second ECU reception units 321. The second ECU 32 is connected to the first brake circuit 11 and the second brake circuit 12 via the second ECU switch 323. The second ECU 32 is connected to the second power supply unit 42 and receives the driving electric power supplied from the second power supply unit 42. In this manner, the first ECU 31 and the second ECU 32 are supplied with the driving electric power from the power supply units 41 and 42 which are different from each other. In the present embodiment, the second ECU 32 functions as a second electronic control unit.

The first ECU 31 and the second ECU 32 are configured to communicate with each other. The first ECU 31 is configured to transmit the process contents of the first ECU processing unit 312 to the second ECU 32 and to receive the process contents of the second ECU processing unit 322 in the second ECU 32. On the other hand, the second ECU 32 is configured to transmit the process contents of the second ECU processing unit 322 to the first ECU 31 and to receive the process contents of the first ECU processing unit 312 in the first ECU 31.

FIG. 2 shows a pendant type brake pedal device as an example of the brake pedal device 90. In the pendant type brake pedal device 90, in a brake pedal 91, a pedal 911 that is depressed by a driver is disposed below an axis center CL of swing in a top-bottom direction when the brake pedal device 90 is mounted in the vehicle. An arrow in FIG. 2 indicates an up-down direction when the brake pedal device 90 is mounted in the vehicle.

The brake pedal device 90 includes the brake pedal 91, a housing 92, and the like. The housing 92 is fixed to a dash panel by bolts or the like (not shown). The brake pedal 91 is formed in a plate shape and disposed obliquely with respect to a floor of the vehicle. Specifically, the brake pedal 91 is disposed obliquely such that its upper end portion faces the front of the vehicle and its lower end portion faces the rear of the vehicle. The pedal 911 that is depressed by the driver is provided at a lower portion of the brake pedal 91.

The brake pedal 91 is fixed to a rotation shaft (not shown) provided inside the housing 92. For this reason, the brake pedal 91 is provided to be swingable about a predetermined axis center CL of the rotation shaft provided in the housing 92. In the present description, the term "swing" refers to a rotational movement in the forward and reverse directions within a predetermined angular range about the predetermined axis center CL.

Although not shown in FIG. 2, a reaction force generation mechanism that generates a reaction force against a pedal force applied to the brake pedal 91 by the driver is provided inside the housing 92.

The first sensor 21 to the fourth sensor 24 shown in FIG. 1 are provided in the brake pedal device 90, detect the operation amount of the brake pedal 91 depressed by the driver, and generate the detection signal corresponding to the detected operation amount to output the detection signal to the ECU 30.

The first sensor 21 includes a first sensor transmission unit 211 that transmits a sensor output signal generated in the first sensor 21. The first sensor transmission unit 211 is connected to the first ECU reception unit 311. The first sensor 21 transmits the generated detection signal from the first sensor transmission unit 211 to the first ECU reception unit 311.

The second sensor 22 includes a second sensor transmission unit 221 that transmits a sensor output signal generated in the second sensor 22. The second sensor transmission unit 221 is connected to the first ECU reception unit 311. The second sensor 22 transmits the generated detection signal from the second sensor transmission unit 221 to the first ECU reception unit 311.

The third sensor 23 includes a third sensor transmission unit 231 that transmits a sensor output signal generated in the third sensor 23. The third sensor transmission unit 231 is connected to the second ECU reception unit 321. The third sensor 23 transmits the generated detection signal from the third sensor transmission unit 231 to the second ECU reception unit 321.

The fourth sensor 24 includes two fourth sensor transmission units 241 that transmit a sensor output signal generated in the fourth sensor 24. One of the two fourth sensor transmission units 241 is connected to the first ECU reception unit 311 and the other is connected to the second ECU reception unit 321. The fourth sensor 24 splits one detection signal generated in the fourth sensor 24 into two by duplicating the one detection signal in an integrated circuit in the fourth sensor 24, thereby generating two detection signals. The two detection signals are the same signal. The fourth sensor 24 transmits one detection signal of the two generated detection signals from one of the fourth sensor transmission units 241 to the first ECU reception unit 311. The fourth sensor 24 transmits the other detection signal of the two generated detection signals from the other of the fourth sensor transmission units 241 to the second ECU reception unit 321.

As the first sensor 21 to the fourth sensor 24, sensors that detect different physical quantities from each other may be adopted so long as the sensors can detect a unique and comparable physical quantity. In the present embodiment, from the viewpoint of the redundancy, as the first sensor 21 to the fourth sensor 24, sensors are adopted which detect three types of physical quantities (for example, pedal rocking angle, pedal stroke amount, and pedal pressure) as pedal operation amounts using different detection methods from each other. Specifically, as a sensor that detects the pedal rocking angle, for example, a magnetic sensor using a Hall element or a magnetic resistance element is adopted. As a sensor that detects the pedal stroke amount, for example, an inductive sensor is adopted. As a sensor that detects a pressure applied when the brake pedal 91 is depressed, for example, a pressure sensor is adopted. For example, when the first sensor 21 is formed of the magnetic sensor, the first sensor 21 is disposed inside the housing 92. For example, when the second sensor 22 is formed of the inductive sensor, the second sensor 22 is disposed outside the housing 92. For example, when the fourth sensor 24 is formed of the pressure sensor, the fourth sensor 24 is disposed inside the pedal 911.

The first sensor 21, the second sensor 22, and the fourth sensor 24, which are connected to the first ECU 31, are formed by combining three sensors that execute detection using different detection methods from each other. In other words, the first sensor 21, the second sensor 22, and the fourth sensor 24, which are connected to the first ECU 31, include at least two sensors that execute detection using different detection methods from each other. The third sensor 23 and the fourth sensor 24, which are connected to the second ECU 32, are formed by combining two sensors that execute detection using different detection methods from each other. For example, the third sensor 23 may be formed of the same magnetic sensor as the first sensor 21, and in this case, the third sensor 23 is disposed inside the housing 92.

The types of the first sensor 21 to the fourth sensor 24 are not limited to the types described above, and various sensors such as a photoelectric sensor and a distortion sensor can be used. The names of the first sensor 21 to the fourth sensor 24 do not limit the mounting positions or the types of the sensors in the brake pedal device 90. The names of the first ECU 31 and the second ECU 32 do not limit the mounting positions or the like.

As a communication method between the first sensor 21 to the fourth sensor 24 and the first ECU 31 and the second ECU 32, analog communication, digital communication, optical communication, or the like can be adopted. Examples of the digital communication include SPI, I2C, UART, and SENT. SPI is an abbreviation for serial peripheral interface. I2C is an abbreviation for inter-integrated circuit. UART is an abbreviation for universal asynchronous receiver/transmitter. SENT is an abbreviation for single edge nibble transmission.

The first sensor 21 and the second sensor 22 are operated by receiving power supplied from the first ECU 31. The third sensor 23 and the fourth sensor 24 are operated by receiving power supplied from the second ECU 32. Even when the first ECU 31 fails, the power is supplied from the second ECU 32, and thus the fourth sensor 24 can continue operating. However, when the second ECU 32 fails and the power supply from the second ECU 32 is stopped, the fourth sensor 24 cannot continue operating. In the present embodiment, a voltage of 5 V is applied to the first sensor 21 and the second sensor 22 from the first ECU 31. A voltage of 5 V is applied to the third sensor 23 and the fourth sensor 24 from the second ECU 32.

Next, the operation of the brake system 1 controlled by the first ECU 31 and the second ECU 32 of the present embodiment will be described with reference to FIGS. 3 to 12. When the driver depresses the brake pedal 91, each of the first sensor 21 to the fourth sensor 24 detects the operation amount of the brake pedal 91 and generates the detection signal corresponding to the detected operation amount to output generated detection signal to the connected first ECU 31 and second ECU 32.

Specifically, the first sensor 21 outputs the detection signal corresponding to the detected operation amount of the brake pedal 91 to the first ECU reception unit 311 of the first ECU 31. The second sensor 22 outputs the detection signal corresponding to the detected operation amount of the brake pedal 91 to the first ECU reception unit 311 of the first ECU 31. The third sensor 23 outputs the detection signal corresponding to the detected operation amount of the brake pedal 91 to the second ECU reception unit 321 of the second ECU 32. The fourth sensor 24 outputs the detection signal corresponding to the detected operation amount of the brake pedal 91 to the first ECU reception unit 311 of the first ECU 31 and the second ECU reception unit 321 of the second ECU 32.

When the detection signal corresponding to the operation amount of the brake pedal 91 is input from each of the first sensor 21 to the fourth sensor 24, the first ECU 31 and the second ECU 32 calculate target deceleration of the vehicle in a target deceleration determination process described later based on the input detection signal. The first ECU 31 and the second ECU 32 control the first brake circuit 11 and the second brake circuit 12 by outputting information on the calculated target deceleration to the first brake circuit 11 and the second brake circuit 12.

When the information on the target deceleration is input, the first brake circuit 11 generates the brake fluid pressure corresponding to the target deceleration in the left front wheel cylinder W1 and the right front wheel cylinder W2. When the information on the target deceleration is input, the second brake circuit 12 generates the brake fluid pressure corresponding to the target deceleration in the left rear wheel cylinder W3 and the right rear wheel cylinder W4. As a result, the brake system 1 generates the braking force for decelerating the vehicle in the left front wheel, the right front wheel, the left rear wheel, and the right rear wheel.

Next, the target deceleration determination process will be described. The first ECU 31 and the second ECU 32 start the control process when, for example, a traveling switch such as an ignition switch or a power switch of the vehicle is turned on. When the detection signals transmitted from the first sensor 21, the second sensor 22, and the fourth sensor 24 are received, the first ECU 31 repeatedly executes the control process shown in FIGS. 3 and 4 at a predetermined control period in the target deceleration determination process. When the detection signals transmitted from the second sensor 22 and the fourth sensor 24 are received, the second ECU 32 repeatedly executes the control process shown in FIGS. 10 and 11 described later at a predetermined control period in the target deceleration determination process. Hereinafter, the detection signal transmitted by the first sensor 21 will also be referred to as a first signal S1, the detection signal transmitted by the second sensor 22 will also be referred to as a second signal S2, the detection signal transmitted by the third sensor 23 will also be referred to as a third signal S3, and the detection signal transmitted by the fourth sensor 24 will also be referred to as a fourth signal S4.

In the brake system 1 of the present embodiment, the ECU 30 includes the first ECU 31 and the second ECU 32, thereby ensuring the redundancy in the system. That is, the brake system 1 of the present embodiment is configured such that the first ECU 31 can calculate the target deceleration, and the second ECU 32 can calculate the target deceleration. Therefore, for example, when the first ECU 31 fails and cannot calculate the target deceleration, the second ECU 32 can calculate the target deceleration. Out of the first ECU 31 and the second ECU 32, the first ECU 31, which has a larger number of sensors connected thereto, is set as a main control device, and the second ECU 32 is set as a spare control device. Therefore, when both of the first ECU 31 and the second ECU 32 can normally calculate the target deceleration, the first ECU 31 holds the initiative in controlling the brake system 1, the target deceleration is calculated by the first ECU 31.

First, the control process executed by the first ECU 31 will be described. First, in step S10, the first ECU 31 determines whether an operation state thereof is a normal state or an abnormal state. The normal state is a state in which the first ECU 31 can normally receive the first signal S1, the second signal S2, and the fourth signal S4, and can normally supply the power to the first sensor 21 and the second sensor 22.

The normal state is a state in which, when the first signal S1, the second signal S2, and the fourth signal S4 are received, the first ECU processing unit 312 can execute a normal process operation based on the first signal S1, the second signal S2, and the fourth signal S4. On the other hand, the abnormal state is a state of one or a combination of the following states applies: the first signal S1, the second signal S2, and the fourth signal S4 cannot be received, the power cannot be supplied to the first sensor 21 and the second sensor 22, and the first ECU processing unit 312 cannot operate normally. In step S11, the first ECU 31 outputs the information on the determined operation state thereof to the second ECU 32. In step S12, the first ECU 31 acquires, from the second ECU 32, information on an operation state of the second ECU 32 determined in the control process of the second ECU 32, which will be described later.

When the first ECU 31 is in a normal state, in step S13, the first ECU 31 acquires the first signal S1 transmitted from the first sensor 21, the second signal S2 transmitted from the second sensor 22, and the fourth signal S4 transmitted from the fourth sensor 24. Although not shown, when the first ECU 31 is in an abnormal state, all of the processes after step S13 are skipped.

When the first ECU 31 acquires the first signal S1, the second signal S2, and the fourth signal S4, in step S14, the first ECU processing unit 312 calculates the operation amount of the brake pedal 91 based on each of the first signal S1, the second signal S2, and the fourth signal S4. Specifically, when the first signal S1 is acquired, the first ECU processing unit 312 calculates the operation amount of the brake pedal 91 detected by the first sensor 21 based on the first signal S1 and a predetermined control map. When the second signal S2 is acquired, the first ECU processing unit 312 calculates the operation amount of the brake pedal 91 detected by the second sensor 22 based on the second signal S2 and the predetermined control map. When the fourth signal S4 is acquired, the first ECU processing unit 312 calculates the operation amount of the brake pedal 91 detected by the fourth sensor 24 based on the fourth signal S4 and the predetermined control map.

Hereinafter, the operation amount of the brake pedal 91 calculated based on the first signal S1 will also be referred to as a first operation amount Fs1, and the operation amount of the brake pedal 91 calculated based on the second signal S2 will also be referred to as a second operation amount Fs2. The operation amount of the brake pedal 91 calculated based on the fourth signal S4 will also be referred to as a fourth operation amount Fs4. As will be described later, the operation amount of the brake pedal 91 calculated by the second ECU 32 based on the third signal S3 will also be referred to as a third operation amount Fs3.

In step S15, the first ECU processing unit 312 determines whether the first sensor 21, the second sensor 22, and the fourth sensor 24, which are connected to the first ECU 31, include a failure based on the first operation amount Fs1, the second operation amount Fs2, and the fourth operation amount Fs4 which are calculated. That is, the first ECU processing unit 312 detects whether all of the first sensor 21, the second sensor 22, and the fourth sensor 24, which are connected to the first ECU 31, are in a normal state and whether the number of sensors in an abnormal state is one or multiple. When the number of sensors in an abnormal state is one, the first ECU processing unit 312 detects that the one sensor in an abnormal state, and when the number of sensors in an abnormal state is multiple, the first ECU processing unit 312 detects sensors that may be in an abnormal state.

Specifically, in step S15, the first ECU processing unit 312 determines whether the first operation amount Fs1 and the second operation amount Fs2 are normal or abnormal, and determines whether a first difference value Δs1, which is a difference value between the first operation amount Fs1 and the second operation amount Fs2, is smaller than an allowable error. The first operation amount Fs1 and the second operation amount Fs2 are determined as being normal, for example, when the first operation amount Fs1 and the second operation amount Fs2 are equal to or greater than an anticipated minimum value of the operation amount and equal to or smaller than an anticipated maximum value of the operation amount. On the other hand, the first operation amount Fs1 and the second operation amount Fs2 are determined as being abnormal when, for example, the first operation amount Fs1 and the second operation amount Fs2 are smaller than the anticipated minimum value of the operation amount or greater than the anticipated maximum value of the operation amount. Whether the third operation amount Fs3 and the fourth operation amount Fs4, which will be described later, are normal or abnormal is also determined in a similar manner.

The first difference value Δs1 is a value obtained by subtracting the second operation amount Fs2 from the first operation amount Fs1, and is calculated as an absolute value. The allowable error of the first difference value Δs1 is determined, for example, within a range in which a detection error of the first sensor 21 itself and a detection error of the second sensor 22 itself overlap each other.

A second difference value Δs2, which is a difference value between the first operation amount Fs1 and the fourth operation amount Fs4, and a third difference value Δs3, which is a difference value between the second operation amount Fs2 and the fourth operation amount Fs4, are also obtained by a similar calculation method as described later. A fourth difference value Δs4, which is a difference value between the third operation amount Fs3 and the fourth operation amount Fs4, is also obtained by a similar calculation method. An allowable error of the second difference value Δs2 is determined, for example, within a range in which the detection error of the first sensor 21 itself and a detection error of the fourth sensor 24 itself overlap each other. An allowable error of the third difference value Δs3 is determined by, for example, the detection error of each of the second sensor 22 itself and the fourth sensor 24 itself. An allowable error of the fourth difference value Δs4 is determined, for example, within a range in which a detection error of the third sensor 23 itself and the detection error of the fourth sensor 24 itself overlap each other.

When the first operation amount Fs1 is not abnormal, the second operation amount Fs2 is not abnormal, and the first difference value Δs1 is smaller than the allowable error, in step S16, the first ECU processing unit 312 sets a first difference flag, which indicates whether the first difference value Δs1 is normal or abnormal, to normal. On the other hand, when at least one of the following states applies: the first operation amount Fs1 is abnormal, the second operation amount Fs2 is abnormal, and the first difference value Δs1 is equal to or greater than the allowable error, in step S17, the first ECU processing unit 312 sets the first difference flag to abnormal.

Subsequently, in step S18, the first ECU processing unit 312 determines whether the first operation amount Fs1 and the fourth operation amount Fs4 are normal or abnormal, and determines whether the second difference value Δs2 is smaller than the allowable error.

When the first operation amount Fs1 is not abnormal, the fourth operation amount Fs4 is not abnormal, and the second difference value Δs2 is smaller than the allowable error, in step S19, the first ECU processing unit 312 sets a second difference flag, which indicates whether the second difference value Δs2 is normal or abnormal, to normal. On the other hand, when at least one of the following states applies: the first operation amount Fs1 is abnormal, the fourth operation amount Fs4 is in abnormal, and the second difference value Δs2 is equal to or greater than the allowable error, in step S20, the first ECU processing unit 312 sets the second difference flag to abnormal.

Subsequently, in step S21, the first ECU processing unit 312 determines whether the second operation amount Fs2 and the fourth operation amount Fs4 are normal or abnormal, and determines whether the third difference value Δs3 is smaller than the allowable error.

When the second operation amount Fs2 is not abnormal, the fourth operation amount Fs4 is not abnormal, and the third difference value Δs3 is smaller than the allowable error, in step S22, the first ECU processing unit 312 sets a third difference flag, which indicates whether the third difference value Δs3 is normal or abnormal, to normal. On the other hand, when at least one of the following states applies: the second operation amount Fs2 is abnormal, the fourth operation amount Fs4 is abnormal, and the third difference value Δs3 is equal to or greater than the allowable error, in step S23, the first ECU processing unit 312 sets the third difference flag to abnormal.

The respective allowable errors for determining whether the first difference value $\Delta s1$, the second difference value $\Delta s2$, and the third difference value $\Delta s3$ are smaller than the allowable errors may be different from each other or may be the same as each other. For example, the allowable error for determining whether the first difference value $\Delta s1$ is smaller than the allowable error and the allowable error for determining whether the second difference value $\Delta s2$ is smaller than the allowable error may be different in magnitude or may be the same in magnitude. The allowable error for determining whether the second difference value $\Delta s2$ is smaller than the allowable error and the allowable error for determining whether the third difference value $\Delta s3$ is smaller than the allowable error may be different in magnitude or may be the same in magnitude.

After the states of the first difference flag, the second difference flag, and the third difference flag are updated in steps S10 to S23, the first ECU processing unit 312 executes a majority determination process. The majority determination process is a process for determining whether each of the first operation amount Fs1, the second operation amount Fs2, and the fourth operation amount Fs4 can be used to calculate the target deceleration. In other words, the majority determination process is a process for determining whether it can be confirmed that a sensor in a normal state is present among the first sensor 21, the second sensor 22, and the fourth sensor 24, which are connected to the first ECU 31.

Figure 5:
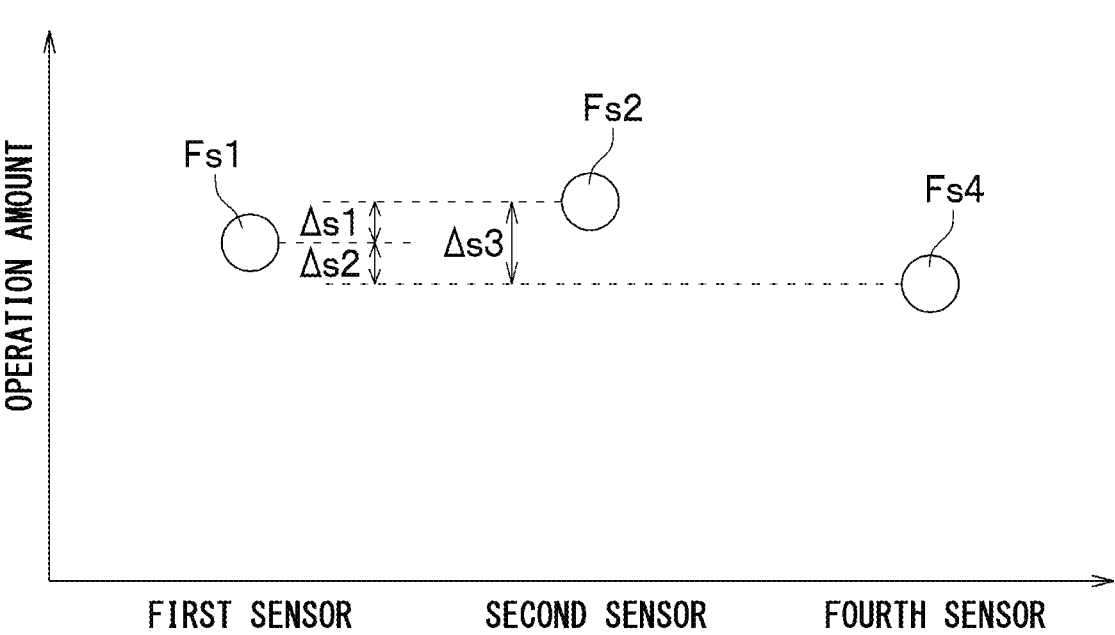
FIG. 5 is a diagram showing an example of an operation amount detected by each sensor when a first sensor, a second sensor, and a fourth sensor are in a normal state.

Specifically, it is determined in step S30 whether the first difference flag, the second difference flag, and the third difference flag are normal. FIG. 5 shows an example when the values of the first operation amount Fs1, the second operation amount Fs2, and the fourth operation amount Fs4 are relatively close to each other, and all of the first difference flag, the second difference flag, and the third difference flag are normal. A horizontal axis in FIG. 5 indicates each of the first sensor 21, the second sensor 22, and the fourth sensor 24. A vertical axis represents the operation amounts of the brake pedal 91 calculated based on the respective detection signals transmitted from the first sensor 21, the second sensor 22, and the fourth sensor 24. The same vertical and horizontal axes also apply to FIGS. 6 to 8 which will be referred to in the following description.

In the present embodiment, the first sensor 21, the second sensor 22, and the fourth sensor 24, which are connected to the first ECU 31, are formed by combining three sensors that detect the operation amount of the brake pedal 91 using different detection methods from each other. Therefore, there is a relatively low possibility that the three sensors using different detection methods from each other, that is, the first sensor 21, the second sensor 22, and the fourth sensor 24 simultaneously fail due to an external factor.

It is assumed that the values of the first operation amount Fs1, the second operation amount Fs2, and the fourth operation amount Fs4 are relatively close or approximately similar to each other, and all of the first difference flag, the second difference flag, and the third difference flag are normal. In this case, there is a high possibility that each of the first sensor 21, the second sensor 22, and the fourth sensor 24 is not failing. In other words, there is a high possibility that each of the first sensor 21, the second sensor 22, and the fourth sensor 24 is in a normal state. There is a high possibility that each of the first operation amount Fs1, the second operation amount Fs2, and the third operation amount Fs3 calculated based on the detection signals transmitted from the first sensor 21, the second sensor 22, and the fourth sensor 24, which are in a normal state, is a normal value.

Therefore, in step S30, when all of the first difference flag, the second difference flag and the third difference flag are normal, the first ECU processing unit 312 determines that all of the first sensor 21, the second sensor 22, and the fourth sensor 24, which are connected to the first ECU 31 are normal. That is, the first ECU processing unit 312 determines that the sensor in a normal state is present among the first sensor 21, the second sensor 22, and the fourth sensor 24, which are connected to the first ECU 31, and specifies the sensor in a normal state. In step S31, the first ECU processing unit 312 sets a majority flag, which indicates a result of the majority determination process, to normal, indicating that all of the connected sensors are normal, and transmits information indicating that the majority flag is normal to the second ECU 32.

In step S32, the first ECU processing unit 312 determines the operation amount of the brake pedal 91, which is a brake control command value, based on the detection signal transmitted from the sensor determined as being in a normal state among the first sensor 21, the second sensor 22, and the fourth sensor 24. In the present embodiment, when there are multiple sensors determined as being normal, the operation amount of the brake pedal 91 is determined based on the detection signal transmitted from the sensor of which a predetermined priority is the highest among the multiple sensors determined as being normal. For example, in the present embodiment, among the first sensor 21, the second sensor 22, and the fourth sensor 24 which detect the operation amount of the brake pedal 91 using different detection methods from each other, a higher priority is given to the first sensor 21, the second sensor 22, and the fourth sensor 24 in an order in which the detection accuracy is assumed as being higher.

Therefore, when the majority flag is determined as being normal in step S31, in step S32, the first ECU processing unit 312 determines the operation amount of the brake pedal 91 as the first operation amount Fs1 calculated based on the operation amount detected by the first sensor 21. The first ECU processing unit 312 calculates the target deceleration of the vehicle based on the first operation amount Fs1, which is the determined operation amount of the brake pedal 91, and the predetermined control map.

The priority for determining the operation amount of the brake pedal 91 is not limited to this order, and may be set in an order different from the order of the first sensor 21, the second sensor 22, and the fourth sensor 24, for example, in an order of the second sensor 22, the fourth sensor 24, and the first sensor 21. The priority for determining the operation amount of the brake pedal 91 may be set in an order of the fourth sensor 24, the first sensor 21, and the second sensor 22, an order of the first sensor 21, the fourth sensor 24, and the second sensor 22, or the like.

The priority for determining the operation amount of the brake pedal 91 may be set in an order other than the order in which the detection accuracy is assumed as being higher, for example, in an order in which failures are assumed to occur less frequently, or in an order less susceptible to external environment influences.

The operation amount of the brake pedal 91 may be determined in a method other than the method using the priority of the sensor. For example, the operation amount of the brake pedal 91 may be determined as the maximum value or the minimum value among the operation amounts calculated based on the detection signals transmitted from the respective sensors determined as being in a normal state. When all of the first sensor 21, the second sensor 22, and the fourth sensor 24 are in a normal state, the operation amount of the brake pedal 91 may be determined as a value different from the maximum value and the minimum value among the operation amounts calculated from the detection signals transmitted from all of the respective sensors.

For example, the operation amount of the brake pedal 91 may be determined based on the detection signals transmitted from the respective sensors determined as being in a normal state and a predetermined function. As an example of using the function, the operation amount of the brake pedal 91 may be determined as an average value of the operation amounts calculated based on the detection signals transmitted from the respective sensors determined as being in a normal state. The operation amount of the brake pedal 91 may be determined based on the operation amount detected by a sensor different from the sensor that detects the maximum value and the minimum value, among the operation amounts calculated based on the detection signals transmitted from the respective sensors determined as being in a normal state.

In the first ECU 31 and the second ECU 32 of the present embodiment, the first ECU 31, which has a larger number of sensors connected thereto, is set as a main control device, and the second ECU 32 is set as a spare control device. Therefore, when the first ECU 31 can calculate the target deceleration of the vehicle, the target deceleration of the vehicle is set to the target deceleration calculated by the first ECU 31. The connection of the first ECU 31 to the first brake circuit 11 and the second brake circuit 12 is turned on by the first ECU switch 313. The connection of the second ECU 32 to the first brake circuit 11 and the second brake circuit 12 is turned off by the second ECU switch 323. The first ECU 31 controls the first brake circuit 11 and the second brake circuit 12 by outputting the information on the target deceleration calculated in step S32 to the first brake circuit 11 and the second brake circuit 12.

When it is not determined in step S30 that all of the first difference flag, the second difference flag, and the third difference flag are normal, the first ECU processing unit 312 executes the process of step S33.

Figure 6:
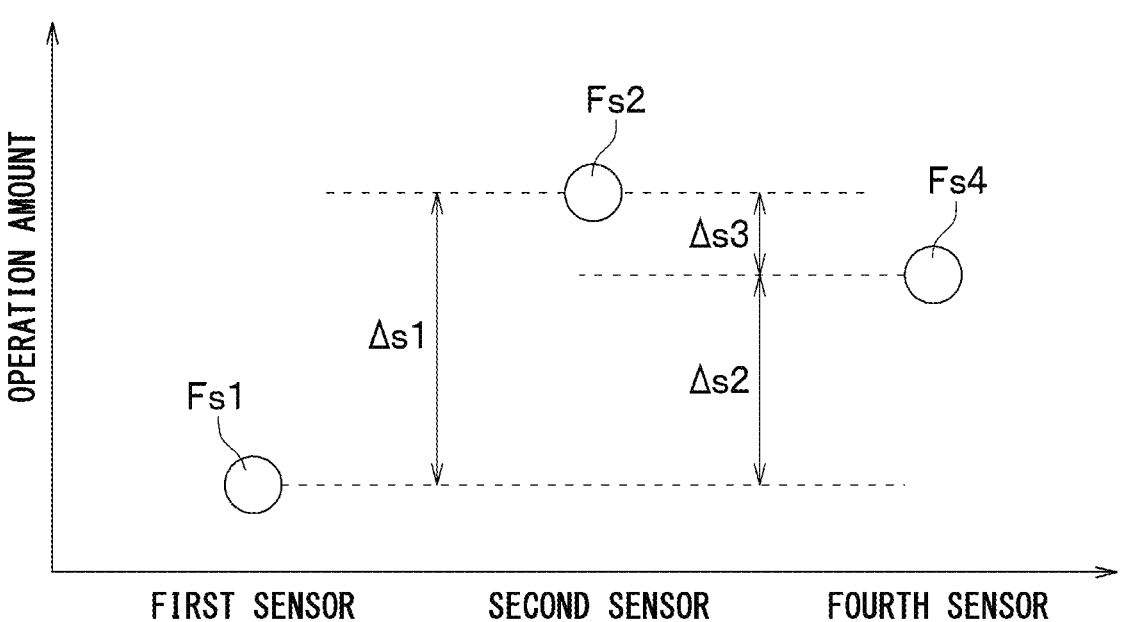
FIG. 6 is a diagram showing an example of the operation amount detected by each sensor when the first sensor is in an abnormal state.

In step S33, the first ECU processing unit 312 determines whether the first difference flag is abnormal, the second difference flag is abnormal, and the third difference flag is normal. FIG. 6 shows an example in which the values of the second operation amount Fs2 and the fourth operation amount Fs4 are relatively close to each other and the third difference value Δs3 is smaller than the allowable error. In the example shown in FIG. 6, the value of the first operation amount Fs1 deviates relatively greatly from the values of the second operation amount Fs2 and the fourth operation amount Fs4, and each of the first difference value Δs1 and the second difference value Δs2 is equal to or greater than the allowable error. In such a case, the first difference flag and the second difference flag are abnormal, and the third difference flag is normal.

When the values of two operation amounts of the three operation amounts have relatively close or approximately similar to each other and the remaining operation amount deviates greatly from the two operation amounts, there is a high possibility that any one of the first sensor 21, the second sensor 22, and the fourth sensor 24 is failing. There is a high possibility that the two sensors are not failing. In other words, there is a high possibility that the two sensors of the first sensor 21, the second sensor 22, and the fourth sensor 24 are in a normal state and that the respective operation amounts of the brake pedal 91 calculated based on the detection signals transmitted from these two sensors in a normal state are normal values. On the other hand, there is a high possibility that the remaining sensor is in an abnormal state and that the operation amount of the brake pedal 91 calculated based on the detection signal transmitted from the remaining sensor in an abnormal state is an abnormal value.

Therefore, when two difference flags of the first difference flag, the second difference flag, and the third difference flag are abnormal, the first ECU processing unit 312 determines that any one of the first sensor 21, the second sensor 22, and the fourth sensor 24, which are connected to the first ECU 31, is in an abnormal state. Specifically, the first ECU processing unit 312 determines that a sensor that detects a common operation amount used to calculate two abnormal difference flags is in an abnormal state. The sensors that are not determined as being in an abnormal state are determined as being in a normal state.

That is, the first ECU processing unit 312 determines that the sensor in a normal state is present among the first sensor 21, the second sensor 22, and the fourth sensor 24, which are connected to the first ECU 31, and specifies the sensor in a normal state. For example, in the example shown in FIG. 6, the first ECU processing unit 312 determines that the first sensor 21 that detects the first operation amount Fs1 used to calculate the first difference flag and the second difference flag that are abnormal is in an abnormal state. The first ECU processing unit 312 determines that the second sensor 22 and the fourth sensor 24 are in a normal state.

In step S34, the majority flag is set to first sensor abnormal, indicating that the first sensor 21 is in an abnormal state, and information indicating that the majority flag is the first sensor abnormal is transmitted to the second ECU 32.

In step S35, the first ECU processing unit 312 determines the operation amounts of the brake pedal 91 based on the detection signals transmitted from the second sensor 22 and the fourth sensor 24, which are determined as being in a normal state, among the first sensor 21, the second sensor 22, and the fourth sensor 24. Specifically, the first ECU processing unit 312 determines the operation amount of the brake pedal 91 as the second operation amount Fs2 based on the predetermined priority.

The first ECU processing unit 312 calculates the target deceleration of the vehicle based on the second operation amount Fs2, which is the determined operation amount of the brake pedal 91, and the predetermined control map. The connection of the first ECU 31 to the first brake circuit 11 and the second brake circuit 12 is turned on by the first ECU switch 313. The connection of the second ECU 32 to the first brake circuit 11 and the second brake circuit 12 is turned off by the second ECU switch 323. The first ECU 31 controls the first brake circuit 11 and the second brake circuit 12 by outputting the information on the calculated target deceleration to the first brake circuit 11 and the second brake circuit 12.

When it is not determined in step S33 that the first difference flag is abnormal, the second difference flag is abnormal, and the third difference flag is normal, the first ECU processing unit 312 executes the process of step S36.

In step S36, the first ECU processing unit 312 determines whether the first difference flag is abnormal, the third difference flag is abnormal, and the second difference flag is normal. When the first difference flag is abnormal, the third difference flag is abnormal, and the second difference flag is normal, the first ECU processing unit 312 determines that the second sensor 22, which detects the second operation amount Fs2 used to calculate the first difference flag and the third difference flag, is in an abnormal state. The first ECU processing unit 312 determines that the first sensor 21 and the fourth sensor 24 are in a normal state.

That is, the first ECU processing unit 312 determines that the sensor in a normal state is present among the first sensor 21, the second sensor 22, and the fourth sensor 24, which are connected to the first ECU 31, and specifies the sensor in a normal state.

In step S37, the majority flag indicating the majority determination result is set to second sensor abnormal, indicating that the second sensor 22 is in an abnormal state, and information indicating that the majority flag is the second sensor abnormal is transmitted to the second ECU 32.

In step S38, the first ECU processing unit 312 determines the operation amounts of the brake pedal 91 based on the detection signals transmitted from the first sensor 21 and the fourth sensor 24, which are determined as being in a normal state, among the first sensor 21, the second sensor 22, and the fourth sensor 24. Specifically, the first ECU processing unit 312 determines the operation amount of the brake pedal 91 as the first operation amount Fs1 based on the predetermined priority.

The first ECU processing unit 312 calculates the target deceleration of the vehicle based on the first operation amount Fs1, which is the determined operation amount of the brake pedal 91, and the predetermined control map. The connection of the first ECU 31 to the first brake circuit 11 and the second brake circuit 12 is turned on by the first ECU switch 313. The connection of the second ECU 32 to the first brake circuit 11 and the second brake circuit 12 is turned off by the second ECU switch 323. The first ECU 31 controls the first brake circuit 11 and the second brake circuit 12 by outputting the information on the calculated target deceleration to the first brake circuit 11 and the second brake circuit 12.

When it is not determined in step S36 that the first difference flag is abnormal, the third difference flag is abnormal, and the second difference flag is normal, the first ECU processing unit 312 executes the process of step S39.

In step S39, the first ECU processing unit 312 determines whether the second difference flag is abnormal, the third difference flag is abnormal, and the first difference flag is normal. When the second difference flag is abnormal, the third difference flag is abnormal, and the first difference flag is normal, the first ECU processing unit 312 determines that the fourth sensor 24, which detects the fourth operation amount Fs4 used to calculate the second difference flag and the third difference flag, is in an abnormal state. The first ECU processing unit 312 determines that the first sensor 21 and the second sensor 22 are in a normal state.

That is, the first ECU processing unit 312 determines that the sensor in a normal state is present among the first sensor 21, the second sensor 22, and the fourth sensor 24, which are connected to the first ECU 31, and specifies the sensor in a normal state.

In step S40, the majority flag is set to fourth sensor abnormal, indicating that the fourth sensor 24 is in an abnormal state, and information indicating that the majority flag is the fourth sensor abnormal is transmitted to the second ECU 32.

In step S41, the first ECU processing unit 312 determines the operation amounts of the brake pedal 91 based on the detection signals transmitted from the first sensor 21 and the second sensor 22, which are determined as being in a normal state, among the first sensor 21, the second sensor 22, and the fourth sensor 24. Specifically, the first ECU processing unit 312 determines the operation amount of the brake pedal 91 as the first operation amount Fs1 based on the predetermined priority.

The first ECU processing unit 312 calculates the target deceleration of the vehicle based on the first operation amount Fs1, which is the determined operation amount of the brake pedal 91, and the predetermined control map. The connection of the first ECU 31 to the first brake circuit 11 and the second brake circuit 12 is turned on by the first ECU switch 313. The connection of the second ECU 32 to the first brake circuit 11 and the second brake circuit 12 is turned off by the second ECU switch 323. The first ECU 31 controls the first brake circuit 11 and the second brake circuit 12 by outputting the information on the calculated target deceleration to the first brake circuit 11 and the second brake circuit 12.

When it is not determined in step S39 that the second difference flag is abnormal, the third difference flag is abnormal, and the first difference flag is normal, the first ECU processing unit 312 executes the process of step S42. The process of step S42 is executed when all of the three difference flags, that is, the first difference flag, the second difference flag, and the third difference flag, are abnormal, or when any two difference flags thereof are abnormal.

Figure 7:
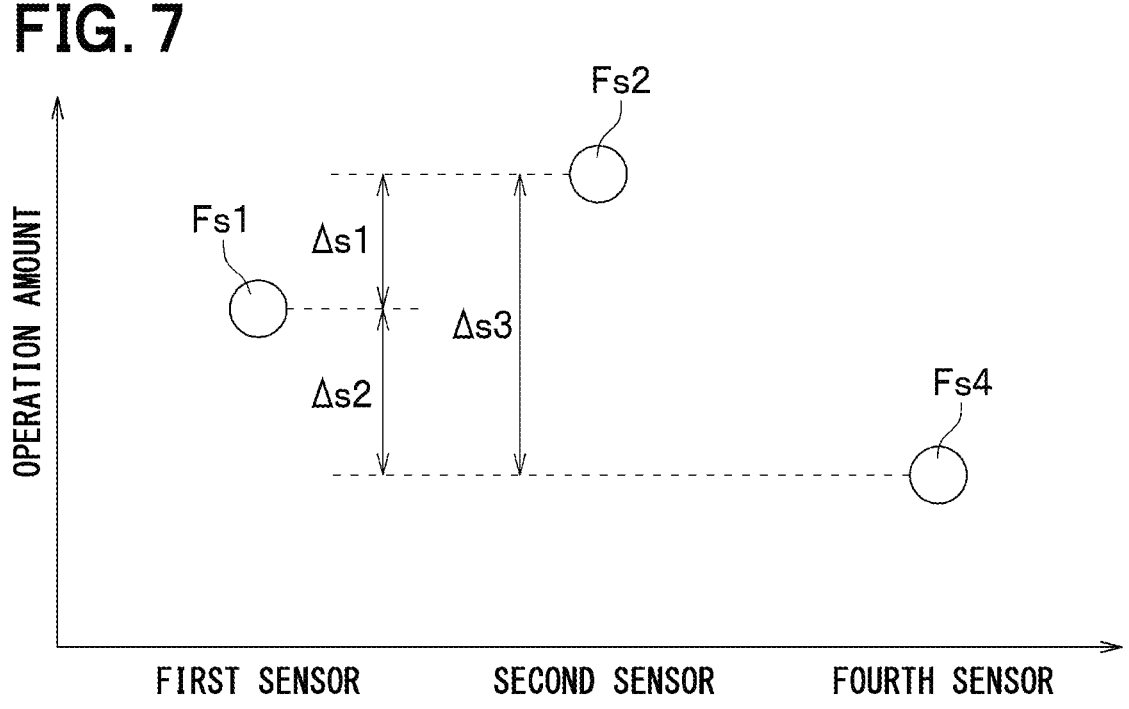
FIG. 7 is a diagram showing an example of the operation amount detected by each sensor when at least two of the first sensor, the second sensor, and the fourth sensor are in an abnormal state.

FIG. 7 shows an example when the first operation amount Fs1, the second operation amount Fs2, and the fourth operation amount Fs4 deviate relatively greatly from each other, and all of the first difference value Δs1, the second difference value Δs2, and the third difference value Δs3 are equal to or greater than the allowable error. In such a case, all of the first difference flag, the second difference flag, and the third difference flag are abnormal.

When the three operation amounts deviate greatly from each other in this way, there is a high possibility that all sensors or any two sensors of the first sensor 21, the second sensor 22, and the fourth sensor 24 are failing. That is, there is a high possibility that all sensors or two sensors of the first sensor 21, the second sensor 22, and the fourth sensor 24 are in an abnormal state.

When all of the first sensor 21, the second sensor 22, and the fourth sensor 24 are in an abnormal state, there is a high possibility that the operation amounts of the brake pedal 91 calculated based on the detection signals transmitted from these three sensors in an abnormal state are abnormal values.

When two sensors of the first sensor 21, the second sensor 22, and the fourth sensor 24 are in an abnormal state, there is a high possibility that the operation amount of the brake pedal 91 calculated based on the detection signal transmitted from the one sensor in a normal state is a normal value. However, when the values of the first operation amount Fs1, the second operation amount Fs2, and the fourth operation amount Fs4 deviate relatively greatly from each other, it is not possible to specify a sensor in a normal state simply by comparing the first operation amount Fs1, the second operation amount Fs2, and the fourth operation amount Fs4.

Therefore, when all of the first difference flag, the second difference flag, and the third difference flag are abnormal, the first ECU processing unit 312 determines that multiple sensors among the first sensor 21, the second sensor 22, and the fourth sensor 24, which are connected to the first ECU 31, are in an abnormal state. That is, the first ECU processing unit 312 does not determine that the sensor in a normal state is present among the first sensor 21, the second sensor 22, and the fourth sensor 24, which are connected to the first ECU 31, and does not specify the sensor in a normal state.

In step S42, the first ECU processing unit 312 sets the majority flag to a majority failure indicating that it is not possible to specify a sensor in a normal state, and transmits information indicating that the majority flag is the majority failure to the second ECU 32. The first ECU processing unit 312 terminates the process without determining the operation amount of the brake pedal 91. That is, the first ECU processing unit 312 does not output information on the target deceleration to the first brake circuit 11 and the second brake circuit 12.

Figure 8:
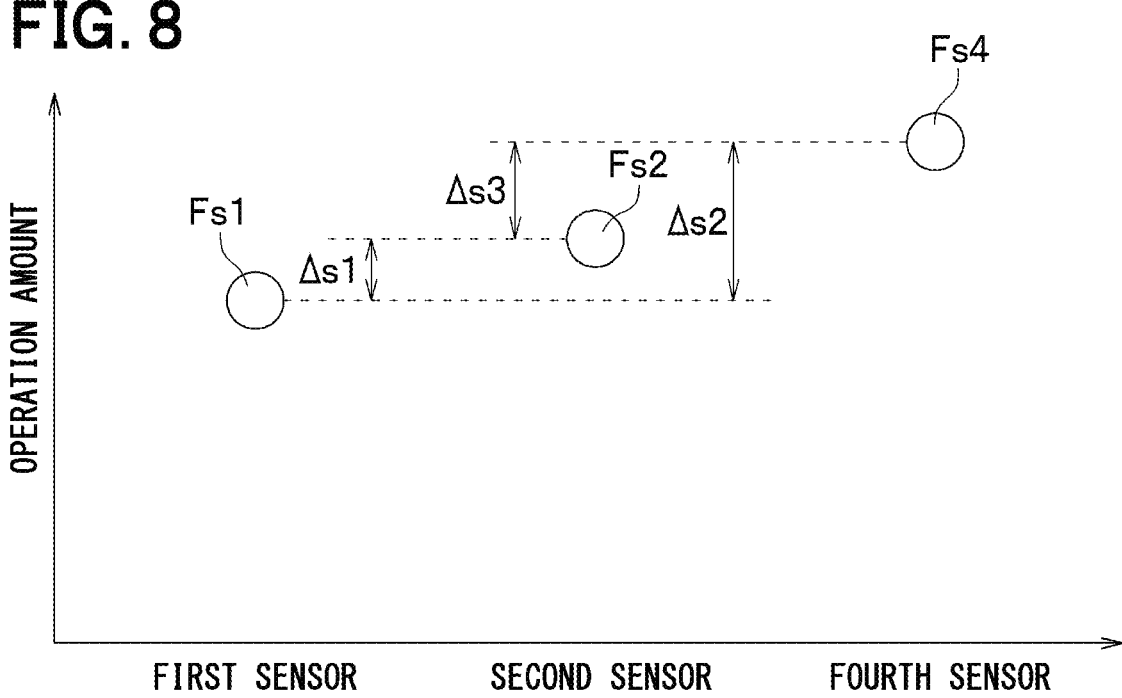
FIG. 8 is a diagram showing another example of the operation amount detected by each sensor when at least two of the first sensor, the second sensor, and the fourth sensor are in an abnormal state.

FIG. 8 shows an example in which the value of the second operation amount Fs2 is relatively close to the values of the first operation amount Fs1 and the fourth operation amount Fs4, and the first difference value Δs1 and the third difference value Δs3 are smaller than the allowable error. In the example shown in FIG. 8, the value of the first operation amount Fs1 deviates relatively greatly from the value of the fourth operation amount Fs4, and the second difference value Δs2 is equal to or greater than the allowable error. In such a case, the first difference flag and the third difference flag are normal, and the second difference flag is abnormal.

In this case, when two difference flags of the three difference flags are normal and the remaining difference flag is abnormal, there is a high possibility that one or two sensors of the first sensor 21, the second sensor 22, and the fourth sensor 24 are failing. In other words, there is a high possibility that the one or two sensors of the first sensor 21, the second sensor 22, and the fourth sensor 24 are in an abnormal state and that the operation amounts of the brake pedal 91 calculated based on the detection signals transmitted from these two sensors in an abnormal state are abnormal values.

However, even when the respective operation amounts of the brake pedal 91 calculated based on the respective detection signals of the first sensor 21, the second sensor 22, and the fourth sensor 24 are compared to each other, it is not possible to specify the number of sensors in an abnormal state or the sensors in an abnormal state.

In this case, when two difference flags of the three difference flags are normal and the remaining difference flag is abnormal, the first ECU processing unit 312 determines that one or multiple sensors of the first sensor 21, the second sensor 22, and the fourth sensor 24 are in an abnormal state. That is, the first ECU processing unit 312 does not determine that the sensor in a normal state is present among the first sensor 21, the second sensor 22, and the fourth sensor 24, which are connected to the first ECU 31, and does not specify the sensor in a normal state.

Therefore, in step S42, the first ECU processing unit 312 sets the majority flag to the majority failure, and transmits the information indicating that the majority flag is the majority failure to the second ECU 32. The first ECU processing unit 312 terminates the process without determining the operation amount of the brake pedal 91. That is, the first ECU processing unit 312 does not output information on the target deceleration to the first brake circuit 11 and the second brake circuit 12.

As described above, in the majority determination process executed in steps S30 to S42, the operation amount of the brake pedal 91 is determined as shown in a table of FIG. 9. Basically, in the brake system 1 of the present embodiment, when the sensor in a normal state can be specified by the first ECU 31 set as the main, the operation amount of the brake pedal 91 is determined based on the detection signal of the sensor that has the highest priority among the sensors in a normal state. That is, when the majority failure is not determined in the majority determination process, the target deceleration can be calculated regardless of whether the second ECU 32 is in a normal state or an abnormal state.

When the majority failure is determined in the majority determination process of the first ECU 31 and the sensor in a normal state cannot be specified, the first ECU 31 cannot determine the operation amount of the brake pedal 91. Therefore, when the second ECU 32 is in a normal state, the operation amount of the brake pedal 91 is determined by the control process executed by the second ECU 32.

Figure 11:
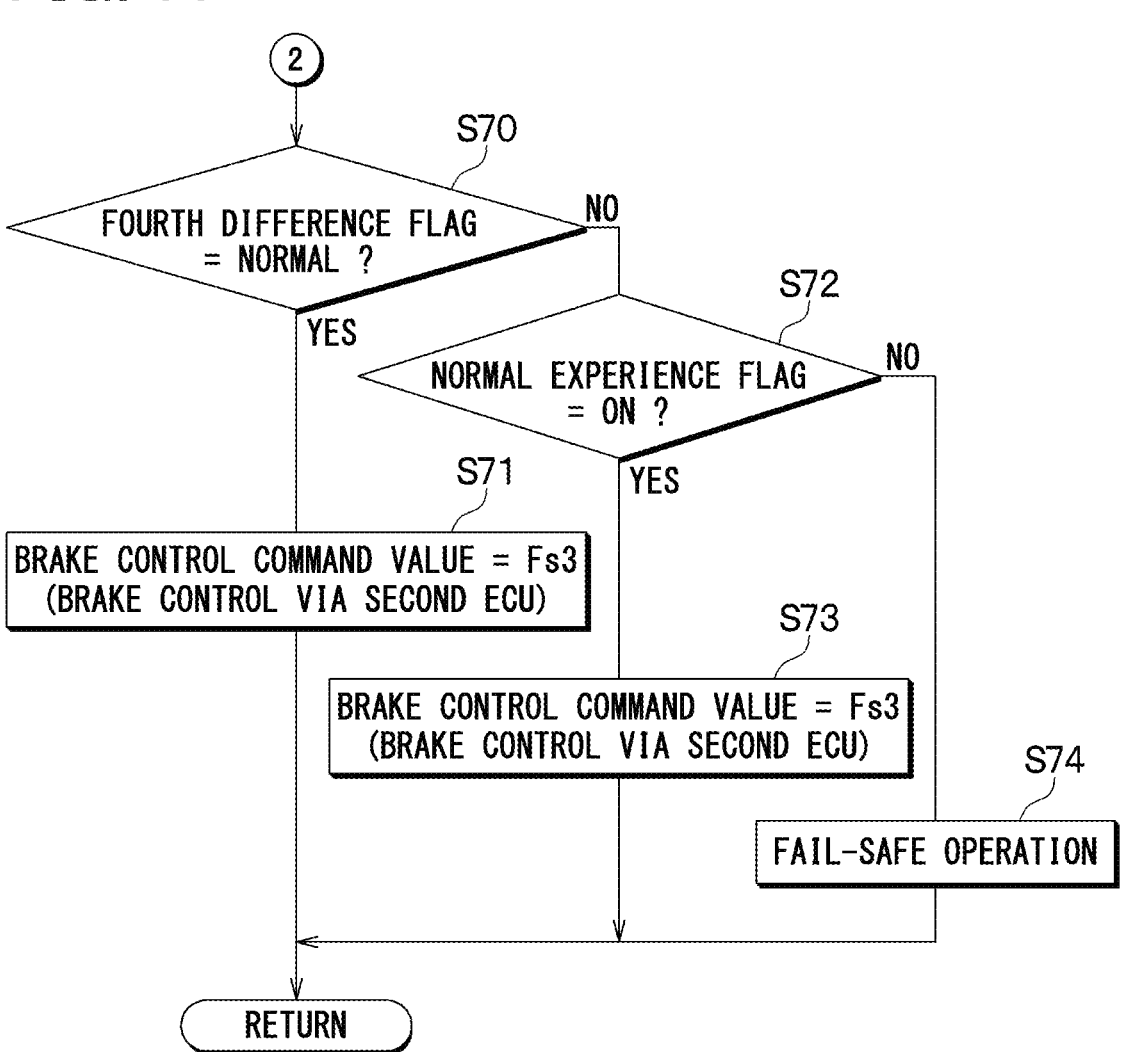
FIG. 11 is a flowchart showing a sensor abnormality determination process executed by the second ECU in the present embodiment.

Next, the control process executed by the second ECU 32 will be described with reference to FIGS. 10 and 11. First, in step S50, the second ECU 32 determines whether an operation state thereof is a normal state or an abnormal state. The normal state is a state in which the second ECU 32 can normally receive the third signal S3 and the fourth signal S4, and can normally supply the power to the third sensor 23 and the fourth sensor 24.

The normal state is a state in which, when the third signal S3 and the fourth signal S4 are received, the second ECU processing unit 322 can execute a normal process operation based on the third signal S3 and the fourth signal S4. On the other hand, the abnormal state is a state of one or a combination of the following states applies: the third signal S3 and the fourth signal S4 cannot be received, the power cannot be supplied to the third sensor 23 and the fourth sensor 24, and the second ECU processing unit 322 cannot execute the normal processing operation. In step S51, the second ECU 32 outputs the information on the determined operation state thereof to the first ECU 31. In step S52, the second ECU 32 acquires, from the first ECU 31, the information on the operation state of the first ECU 31 determined in the process of step S11 of the first ECU 31.

In step S53, the second ECU 32 acquires the information on the majority flag set in the majority determination process of the first ECU 31.

When the second ECU 32 is in a normal state, in step S54, the second ECU 32 acquires the third signal S3 transmitted from the third sensor 23 and the fourth signal S4 transmitted from the fourth sensor 24. Although not shown, when the second ECU 32 is in an abnormal state, all of the processes after step S54 are skipped.

In step S54, when the second ECU 32 acquires the third signal S3 and the fourth signal S4, the second ECU processing unit 322 calculates the operation amount of the brake pedal 91 based on each of the third signal S3 and the fourth signal S4. Specifically, when the third signal S3 is acquired, the second ECU processing unit 322 calculates the third operation amount Fs3 based on the third signal S3 and the predetermined control map. When the fourth signal S4 is acquired, the second ECU processing unit 322 calculates the fourth operation amount Fs4 based on the fourth signal S4 and the predetermined control map. The fourth operation amount Fs4 calculated by the second ECU processing unit 322 in step S54 is equal to the fourth operation amount Fs4 calculated by the first ECU processing unit 312 in step S14.

In step S55, the second ECU processing unit 322 executes a sensor abnormality determination process in the second ECU 32 based on the third operation amount Fs3 and the fourth operation amount Fs4 that are calculated. The sensor abnormality determination of the second ECU 32 is executed to determine whether both of the third sensor 23 and the fourth sensor 24, which are connected to the second ECU 32, are in a normal state, and whether at least one of the third sensor 23 and the fourth sensor 24 is in an abnormal state.

Specifically, in step S55, the second ECU processing unit 322 determines whether the third operation amount Fs3 and the fourth operation amount Fs4 are normal or abnormal, and determines whether the fourth difference value Δs4, which is a difference value between the third operation amount Fs3 and the fourth operation amount Fs4, is smaller than the allowable error.

In the present embodiment, the third sensor 23 and the fourth sensor 24, which are connected to the second ECU 32, are formed by combining two sensors that detect the operation amount of the brake pedal 91 using different detection methods from each other. Therefore, there is a relatively low possibility that the two sensors using different detection methods from each other, that is, the third sensor 23 and the fourth sensor 24 simultaneously fail due to an external factor.

Therefore, when the values of the third operation amount Fs3 and the fourth operation amount Fs4 are relatively close or approximately similar to each other, and the fourth difference value Δs4 is smaller than the allowable error, there is a high possibility that the third sensor 23 and the fourth sensor 24 are not failing. In other words, there is a high possibility that each of the third sensor 23 and the fourth sensor 24 is in a normal state and that the two operation amounts of the brake pedal 91 calculated based on the respective detection signals transmitted from the third sensor 23 and the fourth sensor 24, which are in a normal state, are normal values.

Therefore, when the third operation amount Fs3 and the fourth operation amount Fs4 are normal and the fourth difference value Δs4 is smaller than the allowable error, the second ECU processing unit 322 determines that both of the third sensor 23 and the fourth sensor 24, which are connected to the second ECU 32, are in a normal state. That is, the second ECU processing unit 322 determines that the sensor in a normal state is present among the third sensor 23 and the fourth sensor 24, which are connected to the second ECU 32, and specifies the sensor in a normal state.

On the other hand, when the values of the third operation amount Fs3 and the fourth operation amount Fs4 deviate relatively greatly from each other and the fourth difference value Δs4 is equal to or greater than the allowable error, there is a high possibility that at least one of the third sensor 23 and the fourth sensor 24 is failing. In other words, there is a high possibility that at least one of the third sensor 23 and the fourth sensor 24 is in an abnormal state and that at least one of the two operation amounts of the brake pedal 91 calculated based on the detection signals transmitted from the third sensor 23 and the fourth sensor 24 is an abnormal value.

When the fourth difference value Δs4 is equal to or greater than the allowable error, there is possibility that both of the third sensor 23 and the fourth sensor 24 are failing. There is a possibility that both of the two operation amounts of the brake pedal 91 calculated based on the detection signals transmitted from the third sensor 23 and the fourth sensor 24 are abnormal values.

Therefore, when the third operation amount Fs3 and the fourth operation amount Fs4 are abnormal or the fourth difference value Δs4 is equal to or greater than the allowable error, the second ECU processing unit 322 determines that at least one of the third sensor 23 and the fourth sensor 24 connected to the second ECU 32 is in an abnormal state. That is, the second ECU processing unit 322 does not determine that the sensor in a normal state is present among the third sensor 23 and the fourth sensor 24, which are connected to the second ECU 32, and does not specify the sensor in a normal state.

Therefore, when the third operation amount Fs3 and the fourth operation amount Fs4 are not abnormal and the fourth difference value Δs4 is smaller than the allowable error, in step S56, the second ECU processing unit 322 sets a fourth difference flag, which indicates that the third sensor 23 and the fourth sensor 24 are normal, to normal. The second ECU processing unit 322 executes the process of step S58.

On the other hand, when it is not determined that the third operation amount Fs3 is not abnormal, the fourth operation amount Fs4 is not abnormal, and the fourth difference value Δs4 is smaller than the allowable error, in step S57, the second ECU processing unit 322 sets the fourth difference flag to abnormal. The second ECU processing unit 322 skips the processes of steps S58 and S59.

The magnitude of the allowable error used by the first ECU 31 when executing the majority determination process and the magnitude of the allowable error used by the second ECU 32 when executing the sensor abnormality determination process may be different from each other or may be the same as each other.

In step S58, the second ECU processing unit 322 determines, based on the information on the majority flag transmitted from the first ECU 31, whether the fourth sensor 24 is determined as being in an abnormal state or is determined as having a possibility of being in an abnormal state. The process of step S58 is executed to determine whether the fourth sensor 24 is in a normal state in the majority determination process executed by the first ECU 31 before a point in time when step S58 is executed.

When it is determined that the information on the majority flag transmitted from the first ECU 31 is not the fourth sensor abnormal and is not the majority failure, the second ECU processing unit 322 executes the process of step S59. In other words, when it is determined that the information on the majority flag transmitted from the first ECU 31 is normal, the first sensor abnormal, or the second sensor abnormal, the process of step S59 is executed.

In step S59, the second ECU processing unit 322 turns on a normal experience flag indicating that the fourth sensor 24 is determined as being in a normal state in the majority determination process of the first ECU 31 executed after the vehicle ignition switch is turned on. The normal experience flag is a flag for determining whether the state of the fourth sensor 24 is a normal state or an abnormal state after the ignition switch of the vehicle is turned on.

When the fourth sensor 24 is determined as being in a normal state in the majority determination process of the first ECU 31 executed after the vehicle ignition switch is turned on, the normal experience flag remains on until the ignition switch is turned off. In other words, the normal experience flag remains on when the first ECU 31 can, by the majority determination process, confirm that the state of the fourth sensor 24 is a normal state after the vehicle ignition switch is turned on.

The determination process of step S58 is executed when it is determined in the determination process of step S55 that both of the third sensor 23 and the fourth sensor 24 are in a normal state. Therefore, when the normal experience flag is on, it is indicated that after the ignition switch is turned on, the state of the fourth sensor 24 is a normal state and the state of third sensor 23 is also a normal state.

Although not shown, the normal experience flag is a flag of which an initial value is set to off when the ignition switch of the vehicle is turned on. Therefore, when one of the third sensor 23 and the fourth sensor 24 is in an abnormal state when the ignition switch of the vehicle is turned on, a negative determination is made in step S55, and the normal experience flag remains off until the ignition switch is turned off. When it is not determined that the fourth sensor 24 is in a normal state in the majority determination process of the first ECU 31 executed after the vehicle ignition switch is turned on, the normal experience flag remains off until the ignition switch is turned off.

In step S60, the second ECU processing unit 322 determines whether the first ECU 31 is in a normal state based on the information on the operation state of the first ECU 31 transmitted from the first ECU 31. In step S61, the second ECU processing unit 322 determines whether the information on the majority flag transmitted from the first ECU 31 is the majority failure.

When it is determined that the first ECU 31 is in a normal state and the majority flag information is not the majority failure, the target deceleration of the vehicle is calculated by the first ECU 31. This is because the first ECU 31 can receive normal detection signals from at least two sensors in a normal state among the first sensor 21, the second sensor 22, and the fourth sensor 24. Therefore, the first ECU 31 can calculate the operation amount of the brake pedal 91 based on the detection signal from the sensor in a normal state. Therefore, when a negative determination is not made in steps S60 and S61, the second ECU processing unit 322 terminates the process without determining the operation amount of the brake pedal 91. That is, the second ECU processing unit 322 does not output the information on the target deceleration to the first brake circuit 11 and the second brake circuit 12.

On the other hand, when it is not determined that the first ECU 31 is in a normal state and it is not determined that the information on the majority flag is not the majority failure, the target deceleration of the vehicle cannot be calculated by the first ECU 31. This is because the first ECU 31 cannot specify the sensor in a normal state of the first sensor 21, the second sensor 22, and the fourth sensor 24. In this case, the first ECU 31 cannot calculate the operation amounts of the brake pedal 91 based on the detection signals from the first sensor 21, the second sensor 22, and the fourth sensor 24. Therefore, when a negative determination is made in step S60 or step S61, the control initiative is transferred from the first ECU 31 to the second ECU 32. The second ECU processing unit 322 executes the following process shown in FIG. 11.

In step S70, the second ECU processing unit 322 determines whether the fourth difference flag is normal. That is, in step S70, the second ECU processing unit 322 determines whether both of the third sensor 23 and the fourth sensor 24 are in a normal state. When it is determined in step S71 that the fourth difference flag is normal, the second ECU processing unit 322 determines the operation amounts of the brake pedal 91 based on the detection signals transmitted from the third sensor 23 and the fourth sensor 24. In the present embodiment, the third sensor 23 is set to have a higher priority than the fourth sensor 24. Therefore, the second ECU processing unit 322 determines the operation amount of the brake pedal 91 as the third operation amount Fs3 based on the detection signal transmitted from the third sensor 23 having a higher priority than the fourth sensor 24.

The third sensor 23 may be set to have a lower priority than the fourth sensor 24. In this case, the second ECU processing unit 322 determines the operation amount of the brake pedal 91 as the fourth operation amount Fs4 based on the detection signal transmitted from the fourth sensor 24.

The second ECU processing unit 322 calculates the target deceleration of the vehicle based on the third operation amount Fs3, which is the determined operation amount of the brake pedal 91, and the predetermined control map. The connection of the second ECU 32 to the first brake circuit 11 and the second brake circuit 12 is turned on by the second ECU switch 323. The connection of the first ECU 31 to the first brake circuit 11 and the second brake circuit 12 is turned off by the first ECU switch 313. The second ECU 32 controls the first brake circuit 11 and the second brake circuit 12 by outputting the information on the calculated target deceleration to the first brake circuit 11 and the second brake circuit 12.

On the other hand, when it is not determined in step S70 that the fourth difference flag is normal, the second ECU processing unit 322 determines in step S72 whether the normal experience flag is on.

When it is determined in step S72 that the normal experience flag is on, in step S73, the second ECU processing unit 322 determines the operation amount of the brake pedal 91 based on the detection signal transmitted from the third sensor 23. The second ECU processing unit 322 calculates the target deceleration of the vehicle based on the third operation amount Fs3, which is the determined operation amount of the brake pedal 91, and the predetermined control map. The connection of the second ECU 32 to the first brake circuit 11 and the second brake circuit 12 is turned on by the second ECU switch 323. The connection of the first ECU 31 to the first brake circuit 11 and the second brake circuit 12 is turned off by the first ECU switch 313. The second ECU 32 controls the first brake circuit 11 and the second brake circuit 12 by outputting the information on the calculated target deceleration to the first brake circuit 11 and the second brake circuit 12.

The reason why, when it is determined in step S72 that the normal experience flag is on, the operation amount of the brake pedal 91 is determined based on the detection signal transmitted from the third sensor 23 will be described.

The normal experience flag is turned on when the fourth sensor 24 is determined as being in a normal state in the majority determination process of the first ECU 31 executed after the ignition switch of the vehicle is turned on. The process of step S58 for determining whether the normal experience flag can be changed from off, which is the initial value, to on is executed when it is determined in step S55 that both of the third sensor 23 and the fourth sensor 24 are in a normal state. Therefore, when the normal experience flag is on, it is indicated that the state of the fourth sensor 24 is determined as being in a normal state by the first ECU 31 and the second ECU 32 after the vehicle ignition switch is turned on. When the normal experience flag is turned on, the normal experience flag remains on while the ignition switch of the vehicle is being on.

When the majority failure is determined in the majority determination process, the control initiative is transferred from the first ECU 31 to the second ECU 32. In the present embodiment, the first sensor 21, the second sensor 22, and the fourth sensor 24 are connected to the first ECU 31. In this configuration in which multiple sensors are connected to the first ECU 31, there is a relatively low possibility that the first sensor 21, the second sensor 22, and the fourth sensor 24 simultaneously fail due to an external factor. In particular, in the present embodiment, the first sensor 21, the second sensor 22, and the fourth sensor 24 connected to the first ECU 31 use different detection methods from each other. Therefore, there is an extremely low possibility that the three sensors, the first sensor 21, the second sensor 22, and the fourth sensor 24, which use different detection methods from each other, simultaneously fail due to an external factor. That is, there is an extremely low possibility that multiple sensors among the three sensors, that is, the first sensor 21, the second sensor 22, and the fourth sensor 24, simultaneously fail and thus the majority failure is determined in the majority determination process of the first ECU 31.

Therefore, when it is not determined in step S61 that the majority flag is not the majority failure, it is assumed that two sensors of the first sensor 21, the second sensor 22, and the fourth sensor 24 are in an abnormal state at different times. For example, it is assumed that the second sensor 22 or the fourth sensor 24 is in an abnormal state after elapse of a predetermined period of time since the first sensor 21 is in an abnormal state, and thus it is no longer determined that the majority flag is not the majority failure in step S61. As another example, it is assumed that the first sensor 21 or the second sensor 22 is in an abnormal state after elapse of a predetermined period of time since the fourth sensor 24 is in an abnormal state, and thus it is no longer determined that the majority flag is not the majority failure in step S61.

For example, it is assumed that the fourth sensor 24 is in an abnormal state after the elapse of the predetermined period of time since the first sensor 21 is in an abnormal state, and thus it is no longer determined that the majority flag is not the majority failure in step S61. In this case, the fourth sensor 24 is in an abnormal state, and thus a negative determination is made in step S55. In this case, the fourth difference flag is changed to abnormal in the process of step S57. However, the normal experience flag remains on.

The third sensor 23 and the fourth sensor 24 are connected to the second ECU 32, and there is a relatively low possibility that the third sensor 23 and the fourth sensor 24 simultaneously fail. In particular, in the present embodiment, the third sensor 23 and the fourth sensor 24, which are connected to the second ECU 32, are formed by combining two sensors that detect the operation amount of the brake pedal 91 using different detection methods from each other. Therefore, there is an extremely low possibility that two sensors using different detection methods from each other, that is, the third sensor 23 and the fourth sensor 24 simultaneously fail due to an external factor.

Therefore, when the normal experience flag is on and a negative determination is made in step S55, which is executed in the same control period as the control period in which a negative determination is made in step S61, it is assumed that only the fourth sensor 24 is in an abnormal state. In other words, when it is not determined in step S70 that the fourth difference flag is normal, it can be assumed that the fourth sensor 24, out of the third sensor 23 and the fourth sensor 24, is in an abnormal state, but the third sensor 23 is in a normal state.

In other words, it is assumed that, in a state after the first ECU 31 and the second ECU 32 determine that the fourth sensor 24 is in a normal state, the first ECU 31 is no longer capable of determining that the sensor in a normal state is present among the first sensor 21, the second sensor 22, and the fourth sensor 24. It is assumed that, in a state after the first ECU 31 and the second ECU 32 determine that the fourth sensor 24 is in a normal state, the second ECU 32 is no longer capable of determining that both of the third sensor 23 or the fourth sensor 24 are in a normal state.

In such a case, it can be assumed that the fourth sensor 24 commonly connected to the first ECU 31 and the second ECU 32 is in an abnormal state, resulting in the determination of the majority failure in the majority determination process and the abnormal determination in the sensor abnormality determination. Among the two sensors connected to the second ECU 32, the third sensor 23, which is different from the fourth sensor 24 assumed as being in an abnormal state, can be assumed as being in a normal state.

As described above, when it is determined in step S72 that the normal experience flag is on, the second ECU processing unit 322 can determine the operation amount of the brake pedal 91 based on the detection signal transmitted from the third sensor 23.

It is assumed that, among the first sensor 21, the second sensor 22, and the fourth sensor 24, the fourth sensor 24 is in an abnormal state first. In this case, at a point in time when the fourth sensor 24 is in an abnormal state, a negative determination is made in step S55, and the fourth difference flag is changed to abnormal in the process of step S57. However, the normal experience flag remains on. It is assumed that the first sensor 21 or the second sensor 22 is in an abnormal state after the elapse of the predetermined period of time since the fourth sensor 24 is in an abnormal state, and thus it is no longer determined that the majority flag is not the majority failure in step S61.

In this way, even when two sensors of the first sensor 21, the second sensor 22, and the fourth sensor 24 are in an abnormal state, when the normal experience flag is on, the third sensor 23 is assumed as being in a normal state. In other words, even when two sensors of the first sensor 21, the second sensor 22, and the fourth sensor 24 are in an abnormal state, when the state of the third sensor 23 is a normal state after the vehicle ignition switch is turned on, the third sensor 23 is assumed as being in a normal state.

Therefore, when it is determined in step S72 that the normal experience flag is on, the second ECU processing unit 322 can determine the operation amount of the brake pedal 91 based on the detection signal transmitted from the third sensor 23.

On the other hand, when it is not determined in step S72 that the normal experience flag is on, the second ECU 32 does not determine the operation amount of the brake pedal 91. In step S74, the second ECU 32 outputs a control signal for executing a predetermined fail-safe operation to the first brake circuit 11 and the second brake circuit 12. This is because it is not possible to confirm whether the state of the fourth sensor 24 commonly connected to the first ECU 31 and the second ECU 32 is a normal state after the vehicle ignition switch is turned on.

For example, when the process of step S74 is executed immediately after the vehicle ignition switch is turned on, in the fail-safe operation, a warning of a brake abnormal state may be displayed on a display provided on an instrument panel or the vehicle may be prohibited from traveling. For example, when the process of step S74 is executed while the vehicle is traveling, in the fail-safe operation, a warning of a brake abnormal state may be displayed on a display provided on an instrument panel or a traveling speed of the vehicle may be restricted.

As described above, in the determination process executed in steps S50 to S74, the operation amount of the brake pedal 91 is determined as shown in the table of FIG. 12. Basically, in the brake system 1 of the present embodiment, when the operation amount of the brake pedal 91 can be determined by the first ECU 31 set as the main, the operation amount of the brake pedal 91 is determined by the control process of the first ECU 31. When the majority failure is determined in the majority determination process and the second ECU 32 determines that the third sensor 23 and the fourth sensor 24 are in a normal state, the operation amount of the brake pedal 91 is determined based on the detection signal of the third sensor 23 having a higher priority.

When the majority failure is determined in the majority determination process and the fourth difference flag is not determined as normal, and when the normal experience flag is on, the operation amount of the brake pedal 91 is determined based on the detection signal of the third sensor 23.

As described above, when it is not determined in the majority determination process of the first ECU 31 that the sensor in a normal state is present, and it is determined in the sensor abnormality determination process of the second ECU 32 that the sensor is normal, the brake system 1 controls the brake circuit 10 based on the third operation amount Fs3.

Accordingly, even when two sensors of the first sensor 21, the second sensor 22, and the fourth sensor 24 are in an abnormal state, the brake circuit 10 can be controlled based on the third operation amount Fs3. Therefore, the redundancy of the brake system 1 can be ensured.

The first sensor 21, the second sensor 22, and the fourth sensor 24, which detect the operation amount of the brake pedal 91, are directly connected to the first ECU 31, and the third sensor 23 and the fourth sensor 24 are directly connected to the second ECU 32. Therefore, as compared to a configuration in which the detection signals of the first sensor 21 to the fourth sensor 24 are transmitted and received through mutual communication between the first ECU 31 and the second ECU 32, the occurrence of synchronization delays in the detection signals in the control process of each of the first ECU 31 and the second ECU 32 can be restricted.

Among the first sensor 21 to the fourth sensor 24, the fourth sensor 24 is connected to the first ECU 31 and the second ECU 32, and outputs the operation amount of the brake pedal 91 detected by the fourth sensor 24 to the first ECU 31 and the second ECU 32. Therefore, the number of sensors provided in the brake system 1 can be reduced as compared to a configuration in which the sensor commonly connected to the first ECU 31 and the second ECU 32 is not included. Therefore, it is possible to restrict an increase in size of the housing of the brake system 1 and an increase in costs.

According to the above-described embodiment, the following effects can be obtained.

(1) In the above-described embodiment, when, in a state after the first ECU 31 and the second ECU 32 determine that the fourth sensor 24 is in a normal state, the first ECU 31 does not determine that the sensor in a normal state is present among the first sensor 21, the second sensor 22, and the fourth sensor 24, and the second ECU 32 does not determine that both of the third sensor 23 and the fourth sensor 24 are in a normal state, the first brake circuit 11 and the second brake circuit 12 are controlled based on the operation amount detected by the third sensor 23.

Since there is a low possibility that multiple sensors are in an abnormal state simultaneously, when multiple sensors are in an abnormal state among the first sensor 21, the second sensor 22, and the fourth sensor 24, which are connected to the first ECU 31, there is a high possibility that the sensor in an abnormal state is increased one by one. When both of the third sensor 23 and the fourth sensor 24, which are connected to the second ECU 32, are in an abnormal state, there is a high possibility that one of the sensors is in an abnormal state after elapse of a predetermined period of time since the other sensor is in an abnormal state.

Therefore, when, in a state after the first ECU 31 and the second ECU 32 determine that the fourth sensor 24 is in a normal state, the majority failure is determined in the majority determination process and the abnormality is determined in the sensor abnormality determination process, the third sensor 23 can be assumed as being in a normal state.

Therefore, even when the first ECU 31 cannot determine that the sensor in a normal state is present among the first sensor 21, the second sensor 22, and the fourth sensor 24, the operation amount of the brake pedal 91 can be determined based on the detection signal transmitted from the third sensor 23. Even when two sensors of the first sensor 21, the second sensor 22, and the fourth sensor 24 are in an abnormal state, the brake circuit 10 can be controlled based on the third operation amount Fs3. Therefore, the redundancy of the brake system 1 can be ensured.

(2) In the above-described embodiment, the first ECU 31 determines whether the fourth sensor 24 is in a normal state based on whether the difference between the respective operation amounts detected by the first sensor 21, the second sensor 22, and the fourth sensor 24 is within an allowable value. The second ECU 32 determines whether the fourth sensor 24 is in a normal state based on whether a difference between the respective operation amounts detected by the third sensor 23 and the fourth sensor 24 is within an allowable value.

Accordingly, whether the fourth sensor 24 is in a normal state or an abnormal state can be determined based on the determination result determined by the first ECU 31 and the determination result determined by the second ECU 32, thereby improving the determination accuracy.

(3) In the above-described embodiment, the first ECU 31 and the second ECU 32 are configured to communicate with each other and to transmit and receive a normal state and an abnormal state thereof to and from each other. When one ECU of the first ECU 31 and the second ECU 32 is in an abnormal state, the first brake circuit 11 and the second brake circuit 12 are controlled based on the operation amount detected by the other ECU.

Accordingly, even when the first ECU 31 is in an abnormal state, when the second ECU 32 is in a normal state, the first brake circuit 11 and the second brake circuit 12 can be controlled based on the operation amounts of the brake pedal 91 detected by the third sensor 23 and the fourth sensor 24. Even when the second ECU 32 is in an abnormal state, when the first ECU 31 is in a normal state, the first brake circuit 11 and the second brake circuit 12 can be controlled based on the operation amounts of the brake pedal 91 detected by the first sensor 21, the second sensor 22, and the fourth sensor 24.

(4) In the above-described embodiment, when both of the first ECU 31 and the second ECU 32 are in a normal state, the first brake circuit 11 and the second brake circuit 12 are controlled based on the detection signal transmitted to the first ECU 31.

Accordingly, when both of the first ECU 31 and the second ECU 32 are in a normal state, the process speed can be increased as compared to a configuration in which the first brake circuit 11 and the second brake circuit 12 are controlled based on the respective operation amounts calculated by the first ECU 31 and the second ECU 32.

(5) In the above-described embodiment, the first sensor 21, the second sensor 22, and the fourth sensor 24 include at least two sensors using different detection methods from each other for detecting the operation amount of the brake pedal 91. The third sensor 23 and the fourth sensor 24 use different detection methods from each other for detecting the operation amount of the brake pedal 91.

Accordingly, for example, even when one sensor of the first sensor 21, the second sensor 22, and the fourth sensor 24 cannot detect the operation amount of the brake pedal 91 due to an external environment and the like, the other two sensors can detect the operation amount of the brake pedal 91. For example, even when one sensor of the third sensor 23 and the fourth sensor 24 cannot detect the operation amount of the brake pedal 91 due to the external environment and the like, the other sensor can detect the operation amount of the brake pedal 91.

Other Embodiments

Although the representative embodiment according to the present disclosure is described above, the present disclosure is not limited to the above-described embodiment, and various modifications can be made, for example, as follows.

In the above-described embodiment, an example is described in which the number of sensors connected to the first ECU 31 is three, but the present disclosure is not limited to this. For example, a configuration may be adopted in which four or more sensors are connected to the first ECU 31. In this case, the first ECU 31 executes the majority determination process based on the detection signals transmitted from the four or more sensors, thereby determining whether a sensor in a normal state is present among the four or more sensors.

In the above-described embodiment, an example is described in which the first ECU 31 and the second ECU 32 are configured to communicate with each other and to transmit and receive a normal state and an abnormal state thereof to and from each other, but the present disclosure is not limited to this.

For example, the first ECU 31 and the second ECU 32 may be configured to unable to transmit and receive a normal state and an abnormal state thereof to and from each other. In this case, the first ECU 31 and the second ECU 32 may transmit the determined operation amounts to the first brake circuit 11 and the second brake circuit 12 independently of each other.

The first brake circuit 11 and the second brake circuit 12 may be configured to execute the fail-safe operation when the determined operation amount cannot received from both of the first ECU 31 and the second ECU 32. Alternatively, when the determined operation amount is received from at least one of the first ECU 31 and the second ECU 32, the first brake circuit 11 and the second brake circuit 12 may operate based on the received operation amount.

In the above-described embodiment, an example is described in which, when one ECU of the first ECU 31 and the second ECU 32 is in an abnormal state, the first brake circuit 11 and the second brake circuit 12 are controlled based on the operation amount detected by the other ECU, but the present disclosure is not limited to this. For example, a configuration may be adopted in which, when one ECU of the first ECU 31 and the second ECU 32 is in an abnormal state, the other ECU outputs the control signal for executing the fail-safe operation to the first brake circuit 11 and the second brake circuit 12.

In the above-described embodiment, an example is described in which the first brake circuit 11 and the second brake circuit 12 are controlled based on the operation amount transmitted to the first ECU 31 when both of the first ECU 31 and the second ECU 32 are in a normal state, but the present disclosure is not limited to this. A configuration may be adopted in which, when both of the first ECU 31 and the second ECU 32 are in a normal state, the first brake circuit 11 and the second brake circuit 12 is controlled based on the operation amount transmitted to the second ECU 32.

In the above-described embodiment, an example is described in which, when the first ECU 31 is in a normal state, the target deceleration is calculated based on the operation amount detected by the sensor determined as being in a normal state among multiple sensors connected to the first ECU 31, but the present disclosure is not limited to this. For example, when the first ECU 31 is in a normal state and the second ECU 32 is in a normal state, the target deceleration may be calculated based on the operation amounts detected by one or multiple sensors determined as being in a normal state among the first sensor 21 to the fourth sensor 24. For example, when it is determined that all of the first sensor 21 to the fourth sensor 24 are in a normal state, the target deceleration may be calculated based on an average value of the respective operation amounts detected by the first sensor 21 to the fourth sensor 24.

In the above-described embodiment, an example is described in which the first sensor 21, the second sensor 22, and the fourth sensor 24 use different detection methods from each other for detecting the operation amount of the brake pedal 91, but the present disclosure is not limited to this. An example is described in which the third sensor 23 and the fourth sensor 24 use different detection methods from each other for detecting the operation amount of the brake pedal 91, but the present disclosure is not limited to this.

For example, the first sensor 21, the second sensor 22, and the fourth sensor 24 may be configured to have the same detection method for detecting the operation amount of the brake pedal 91. A configuration may be adopted in which, among the first sensor 21, the second sensor 22, and the fourth sensor 24, two of the three sensors use the same detection method for detecting the operation amount of the brake pedal 91, and the remaining sensor uses a different detection method. The third sensor 23 and the fourth sensor 24 may be configured to use the same detection method for detecting the operation amount of the brake pedal 91.

In the above-described embodiment, it is obvious that elements forming the embodiment are not always essential unless otherwise particularly specified as being essential or deemed as being apparently essential in principle.

In the above-described embodiment, when the number, the numerical value, the amount, the range, and the like of the components of the embodiment are referred to, the present disclosure is not limited to a specific number of components of the embodiments unless otherwise particularly specified as being essential or deemed as being apparently limited to the specific number in principle.

In the above-described embodiment, when the shape, the positional relationship, and the like of the component and the like are referred to, the present disclosure is not limited to a specific shape, a specific positional relationship, and the like unless otherwise particularly specified or deemed as being apparently limited to the specific shape, the specific positional relationship, and the like in principle.

(Characteristics of Present Disclosure)

(First Aspect)

A brake system is configured to control a brake circuit (10) that is configured to brake a vehicle. The brake system comprises: four or more sensors (21, 22, 23, 24) configured to detect an operation amount of a brake pedal (91) operated by a driver and generate a detection signal corresponding to the detected operation amount to output the generated detection signal; and an electronic control unit (30) configured to control the brake circuit based on the operation amounts detected by the four or more sensors. The electronic control unit includes a first electronic control unit (31) to which three or more sensors (21, 22, 24) of the four or more sensors, excluding one predetermined sensor (23) of the four or more sensors, are connected, and a second electronic control unit (32) to which two sensors, which include the predetermined sensor and one common sensor (24), of the three or more sensors are connected. The first electronic control unit is capable of determining whether a sensor in a normal state is present among the three or more sensors based on the respective operation amounts detected by the three or more sensors. The second electronic control unit is capable of determining whether both of the two sensors are in a normal state based on the respective operation amounts detected by the two sensors. When the first electronic control unit does not determine that the sensor in a normal state is present among the three or more sensors, and when the second electronic control unit determines that both of the two sensors are in the normal state, the electronic control unit is configured to control the brake circuit based on the operation amount detected by at least one of the predetermined sensor and the common sensor.

(Second Aspect)

The brake system is according to the first aspect. After the first electronic control unit and the second electronic control unit determine that the common sensor is in the normal state, when the first electronic control unit does not to determine that the sensor in the normal state is present among the three or more sensors, and when the second electronic control unit does not determine that both of the two sensors are in the normal state, the electronic control unit is configured to control the brake circuit based on the operation amount detected by the predetermined sensor.

(Third Aspect)

The brake system is according to the second aspect. The first electronic control unit is configured to determine whether the common sensor is in the normal state based on whether a difference between the respective operation amounts detected by the three or more sensors is within a predetermined allowable error, and the second electronic control unit is configured to determine whether the common sensor is in the normal state based on whether a difference between the respective operation amounts detected by the two sensors is within a predetermined allowable error.

(Fourth Aspect)

The brake system according to any one of the first to third aspects. The first electronic control unit and the second electronic control unit are configured to communicate with each other and to transmit and receive a normal state and an abnormal state thereof to and from each other, and when one of the first electronic control unit and the second electronic control unit is in the abnormal state, the brake circuit is to be controlled based on the operation amount transmitted to an other of the first electronic control unit and the second electronic control unit.

(Fifth Aspect)

The brake system is according to any one of the first to fourth aspects. When both of the first electronic control unit and the second electronic control unit are in the normal state, the brake circuit is to be controlled based on the detection signal transmitted to any one of the first electronic control unit and the second electronic control unit.

(Sixth Aspect)

The brake system according to any one of the first to fifth aspects. The three or more sensors connected to the first electronic control unit include at least two sensors using different detection methods from each other to detect the operation amount of the brake pedal, and the two sensors connected to the second electronic control unit use different detection methods from each other to detect the operation amount of the brake pedal.

What is claimed is:

1. A brake system configured to control a brake circuit that is configured to brake a vehicle, the brake system comprising:

four or more sensors configured to detect an operation amount of a brake pedal operated by a driver, generate a detection signal corresponding to the detected operation amount, and output the generated detection signal; and an electronic control unit configured to control the brake circuit based on the operation amounts detected by the four or more sensors, the electronic control unit including a first electronic control unit to which three or more sensors of the four or more sensors, excluding one predetermined sensor of the four or more sensors, are connected, and a second electronic control unit to which two sensors, which include the predetermined sensor and one common sensor, of the three or more sensors are connected, wherein the first electronic control unit is capable of determining whether a sensor in a normal state is present among the three or more sensors based on the respective operation amounts detected by the three or more sensors, the second electronic control unit is capable of determining whether both of the two sensors are in a normal state based on the respective operation amounts detected by the two sensors, and when the first electronic control unit does not determine that the sensor in the normal state is present among the three or more sensors, and the second electronic control unit determines that both of the two sensors are in the normal state, the electronic control unit is configured to control the brake circuit based on the operation amount detected by at least one of the predetermined sensor or the common sensor.

2. The brake system according to claim 1, wherein after the first electronic control unit and the second electronic control unit determine that the common sensor is in the normal state, when the first electronic control unit does not to determine that the sensor in the normal state is present among the three or more sensors, and when the second electronic control unit does not determine that both of the two sensors are in the normal state, the electronic control unit is configured to control the brake circuit based on the operation amount detected by the predetermined sensor.

3. The brake system according to claim 2, wherein the first electronic control unit is configured to determine whether the common sensor is in the normal state based on whether a difference between the respective operation amounts detected by the three or more sensors is within a predetermined allowable error, and the second electronic control unit is configured to determine whether the common sensor is in the normal state based on whether a difference between the respective operation amounts detected by the two sensors is within a predetermined allowable error.

4. The brake system according to claim 1, wherein the first electronic control unit and the second electronic control unit are configured to communicate with each other and to transmit and receive a normal state and an abnormal state thereof to and from each other, and when one of the first electronic control unit and the second electronic control unit is in the abnormal state, the brake circuit is to be controlled based on the operation amount transmitted to an other of the first electronic control unit and the second electronic control unit.

5. The brake system according to claim 4, wherein when both of the first electronic control unit and the second electronic control unit are in the normal state, the brake circuit is to be controlled based on the detection signal transmitted to any one of the first electronic control unit and the second electronic control unit.

6. The brake system according to claim 1, wherein the three or more sensors connected to the first electronic control unit include at least two sensors using different detection methods from each other to detect the operation amount of the brake pedal, and the two sensors connected to the second electronic control unit use different detection methods from each other to detect the operation amount of the brake pedal.

7. A brake system configured to control a brake circuit that is configured to brake a vehicle, the brake system comprising:

four or more sensors configured to detect an operation amount of a brake pedal operated by a driver and generate a detection signal corresponding to the detected operation amount to output the generated detection signal; and an electronic control circuit configured to control the brake circuit based on the operation amounts detected by the four or more sensors, the electronic control circuit including a first electronic control circuit to which three or more sensors of the four or more sensors, excluding one predetermined sensor of the four or more sensors, are connected, and a second electronic control circuit to which two sensors, which include the predetermined sensor and one common sensor, of the three or more sensors are connected, wherein the first electronic control circuit is capable of determining whether a sensor in a normal state is present among the three or more sensors based on the respective operation amounts detected by the three or more sensors, the second electronic control circuit is capable of determining whether both of the two sensors are in a normal state based on the respective operation amounts detected by the two sensors, and when the first electronic control circuit does not determine that the sensor in a normal state is present among the three or more sensors, and the second electronic control circuit determines that both of the two sensors are in the normal state, the electronic control circuit is configured to control the brake circuit based on the operation amount detected by at least one of the predetermined sensor or the common sensor.

* * * * *